(12) United States Patent
DeYaeger

(10) Patent No.: US 9,243,880 B2
(45) Date of Patent: Jan. 26, 2016

(54) SYSTEM AND METHOD FOR VERIFYING SCREW THREADS

(71) Applicant: Jonathan DeYaeger, Rochester, NY (US)

(72) Inventor: Jonathan DeYaeger, Rochester, NY (US)

(*) Notice: Subject to any disclaimer, the term of this patent is extended or adjusted under 35 U.S.C. 154(b) by 24 days.

(21) Appl. No.: 14/197,354

(22) Filed: Mar. 5, 2014

(65) Prior Publication Data

US 2015/0204644 A1 Jul. 23, 2015

Related U.S. Application Data

(60) Provisional application No. 61/930,549, filed on Jan. 23, 2014.

(51) Int. Cl.
| | |
|---|---|
| B25B 23/14 | (2006.01) |
| G01B 3/36 | (2006.01) |
| G01B 3/48 | (2006.01) |
| G01L 5/00 | (2006.01) |

(52) U.S. Cl.
CPC .. G01B 3/36 (2013.01); G01B 3/48 (2013.01); G01L 5/0042 (2013.01)

(58) Field of Classification Search
CPC .... D05B 59/02; D05B 69/36; B25B 23/1422; B25B 23/10; G01B 3/36; G01B 3/48; G01L 5/0042
USPC ........... 73/862.08, 862.23, 862.324, 862.325, 73/761
See application file for complete search history.

(56) References Cited

U.S. PATENT DOCUMENTS

| | | |
|---|---|---|
| 2,861,347 A | 2/1957 | Von Tarnik |
| 3,814,934 A | 6/1974 | Mesh et al. |
| 4,562,722 A | 1/1986 | Schuele et al. |
| 4,693,196 A * | 9/1987 | Hager ............................ 112/273 |
| 4,926,700 A | 5/1990 | Peplinski |
| 5,018,465 A * | 5/1991 | Hager et al. .................. 112/273 |
| 5,199,175 A | 4/1993 | Green |
| 5,319,984 A | 6/1994 | Humphries et al. |
| 5,350,127 A * | 9/1994 | Arnold et al. .............. 242/475.7 |
| 6,106,088 A | 8/2000 | Wafler |
| 7,059,055 B2 | 6/2006 | Wickham et al. |
| 7,484,427 B2 | 2/2009 | Kolkind |
| 7,533,471 B2 | 5/2009 | Lange et al. |
| 7,661,196 B1 | 2/2010 | Kipnes |
| 7,941,932 B2 | 5/2011 | Kipnes |
| 2003/0000439 A1* | 1/2003 | Mizuno ........................ 112/278 |
| 2010/0018066 A1* | 1/2010 | Kipnes ................... G01B 7/284 33/199 R |

(Continued)

OTHER PUBLICATIONS

Emuge Thread Gauge Article, Sep. 2009.

*Primary Examiner* — Max Noori
(74) *Attorney, Agent, or Firm* — Basch & Nickerson LLP

(57) ABSTRACT

A thread gauge inspection apparatus includes a receiving member to hold a reference thread gauge and a motor to bi-directionally rotate the reference thread gauge. A counter counts a number of turns the reference thread gauge is rotated by the motor, and a torque monitoring device monitors the torque produced by the motor as the reference thread gauge is rotated. A controller, when the monitored torque exceeds a predetermined value, causes the motor to stop rotating the reference thread gauge and causes the counter to stop counting the number of turns the reference thread gauge is rotated. The controller compares the count produced by the counter with an inputted specific turn count and indicates the thread quality of threaded hole or a threaded stud passed inspection when the count produced by the counter is equal to the inputted specific turn count.

20 Claims, 11 Drawing Sheets

(56) References Cited

U.S. PATENT DOCUMENTS

| | | | |
|---|---|---|---|
| 2013/0087086 A1* | 4/2013 | Lizaso | 112/273 |
| 2015/0204642 A1 | 7/2015 | DeYaeger | |
| 2015/0204643 A1 | 7/2015 | DeYaeger | |
| 2015/0204644 A1 | 7/2015 | DeYaeger | |

* cited by examiner

SYSTEM AND METHOD FOR VERIFYING SCREW THREADS

The present application claims priority, under 35 U.S.C. §119(e), from U.S. Provisional Patent Application Ser. No. 61/930,549, filed on Jan. 23, 2014. The entire content of U.S. Provisional Patent Application Ser. No. 61/930,549, filed on Jan. 23, 2014, is hereby incorporated by reference.

BACKGROUND

Thread inspections are a necessary part of many manufacturing or quality control procedures. These thread inspections may involve the spinning of externally or internally threaded gauges into threaded holes or onto threaded studs, respectively. The threaded holes or studs may be integral parts of machines or just fastener parts, such as nuts or bolts.

Go and No-Go Gauges have been, conventionally, used as screw thread inspection devices, throughout the machining industry, for the functional inspection for acceptable pitch, diameter, lead angle, thread crest, and root dimensions of a thread.

It is further noted that, conventionally, power driven spindles, on which gauges are fitted, have been used to facilitate rapid and uniform testing of screw threads.

For example, U.S. Pat. No. 4,926,700 discloses a blind hole thread gauge using a modified commercial nut driver. U.S. Pat. No. 4,926,700 discloses the use of strain gauges to monitor torque during testing, as well as, sensing when a given hole has been tested to its proper depth. The entire content of U.S. Pat. No. 4,926,700 is hereby incorporated by reference.

In another example, U.S. Pat. No. 7,059,055 discloses a commercial tester for checking the presence of threads in blind holes. Both single spindle and multi-spindle devices are described, which use adjustable slip clutches to limit the torque applied during testing. Upon detecting the proper depth of testing or upon exceeding the torque limit, U.S. Pat. No. 7,059,055 discloses that the tester automatically reverses the drive motor to disengage the gauge from the hole being tested. The entire content of U.S. Pat. No. 7,059,055 is hereby incorporated by reference.

In further examples, U.S. Pat. No. 7,661,196 and U.S. Pat. No. 7,941,932 disclose a compact hand-held ergonomic thread inspection tool that is power driven, which uses current draw or a mechanical clutch, as a surrogate for torque, to initiate automatic reversal and gauge withdrawal in case of jamming. U.S. Pat. No. 7,661,196 and U.S. Pat. No. 7,941,932 disclose that if a maximum torque is reached before a limit sensor is tripped, an alarm is initiated (indicating a defective thread), and the rotation of the thread gauge is reversed.

In other words, U.S. Pat. No. 7,661,196 and U.S. Pat. No. 7,941,932 determine if a threaded hole or stud is too short, the threads are untrue, or the threaded hole or stud is skewed away from the desired axis. The entire contents of U.S. Pat. No. 7,661,196 and U.S. Pat. No. 7,941,932 are hereby incorporated by reference.

As noted above, parts containing blind machined threaded bores often require inspection of the threads to verify for consistency before the machined parts can be shipped or assembled.

For example, the machining specification for a machined threaded bore may call for the machined threaded bore to have between 5.5 and 6.5 turns. In other words, if the machined threaded bore is outside the specified range, the machined threaded bore may be considered defective in view of the machining specifications.

If the machining specification calls for such a specific turn count, the above noted examples may be able to determine if one boundary (under threaded) of the range is met, but these conventional device are not able to determine if the other boundary (over threaded) of the range is met.

Conventionally, when the specification calls for a specific turn count into the bore, the inspection is carried out by a quality control technician, who manually counts the number of turns of the gauge to validate the thread length. However, this conventional counting method presents many issues.

With respect to quality assurance, since the counting is done manually by a quality control technician, the quality control technician may generate a false count if the quality control technician loses count or focus during the procedure. This is especially true when monitoring a large number of turns on a plurality of parts.

Moreover, due to the repetitive manual (turning) nature of the conventional counting technique, a quality control technician is more susceptible to carpal tunnel syndrome.

Therefore, it is desirable to provide a process and/or device for determining if a specific turn count specification has been met, which does not rely upon the manual counting of a quality control technician.

Moreover, it is desirable to provide an ergonomic process and/or device for determining if a specific turn count specification has been met, which is ergonomically designed to reduce the technician's susceptibility to carpal tunnel syndrome.

Furthermore, it is desirable to provide an ergonomic process and/or device for determining if a specific turn count specification has been met, which does not rely upon the manual counting of a quality control technician and is ergonomically designed to reduce the technician's susceptibility to carpal tunnel syndrome.

BRIEF DESCRIPTION OF THE DRAWINGS

The drawings are only for purposes of illustrating various embodiments and are not to be construed as limiting, wherein.

DETAILED DESCRIPTION

Figure 1:
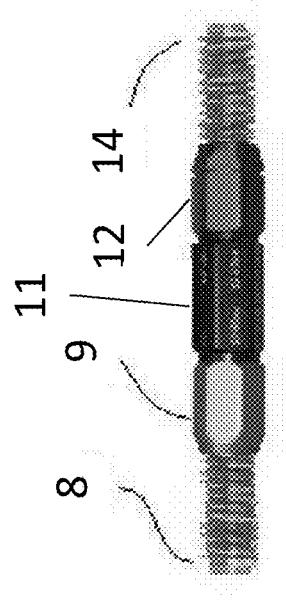
FIG. 1 is a representation of a prior art tapered thread gauge and handle.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

In the following description a reference thread gauge refers to a ring gauge, a thread plug, or other reference (control) gauge device used to test or inspect the physical characteristics (quality) of a machined thread.

For example, a ring gauge, as known to those skilled in the art, is, conventionally, a cylindrical ring, often steel, having an inside diameter finished to gauge tolerance and is used for checking the external diameter of a cylindrical threads. Typically, ring gauges come in pairs (Go and No-Go), wherein the Go ring gauge should rotate onto the part (threaded stud), and the No-Go ring gauge should not rotate onto the part (threaded stud).

On other hand, a thread plug, as known to those skilled in the art, conventionally, is a plug (cylinder), often steel, having an outside diameter finished to gauge tolerance and is used to inspect the inside diameter of a tapped hole with a Go, No-Go system. The Go portion of the thread plug should rotate into the part (threaded hole), and the No-Go portion of the thread plug should not rotate into the part (threaded hole).

It is noted that a machined thread may be created by a machine rotating a threading device or a threading device being manually rotated by an operator.

In FIG. 1, a conventional "Go" gauge 2 has a tapered shank which corresponds to a tapered bore within holder 4, which is also the same for a conventional "No-Go" gauge 6 on the opposing end.

Figure 2:
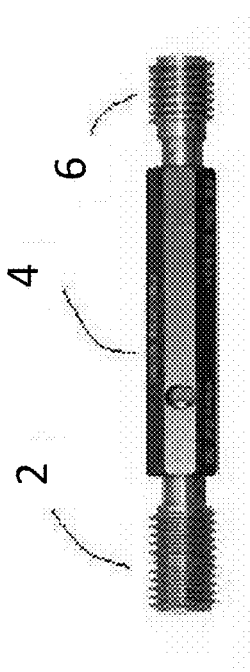
FIG. 2 is a representation of a prior art reversible thread gauge and handle.

In FIG. 2, a handle 11 includes two collets, collet 9 for the conventional "Go" gauge 8 and collet 12 for a conventional "No-Go" gauge 14. In this example, the gauge is threaded so as to be able to be flipped end for end when one end is worn out, effectively doubling the useful life of the gauge.

As illustrated in FIGS. 1 and 2, the gauge is grasped and manually turned to inspect a threaded hole. Such a manual inspection process can produced false results due to miscounts and makes the technician more susceptible to carpal tunnel syndrome.

Figure 3:
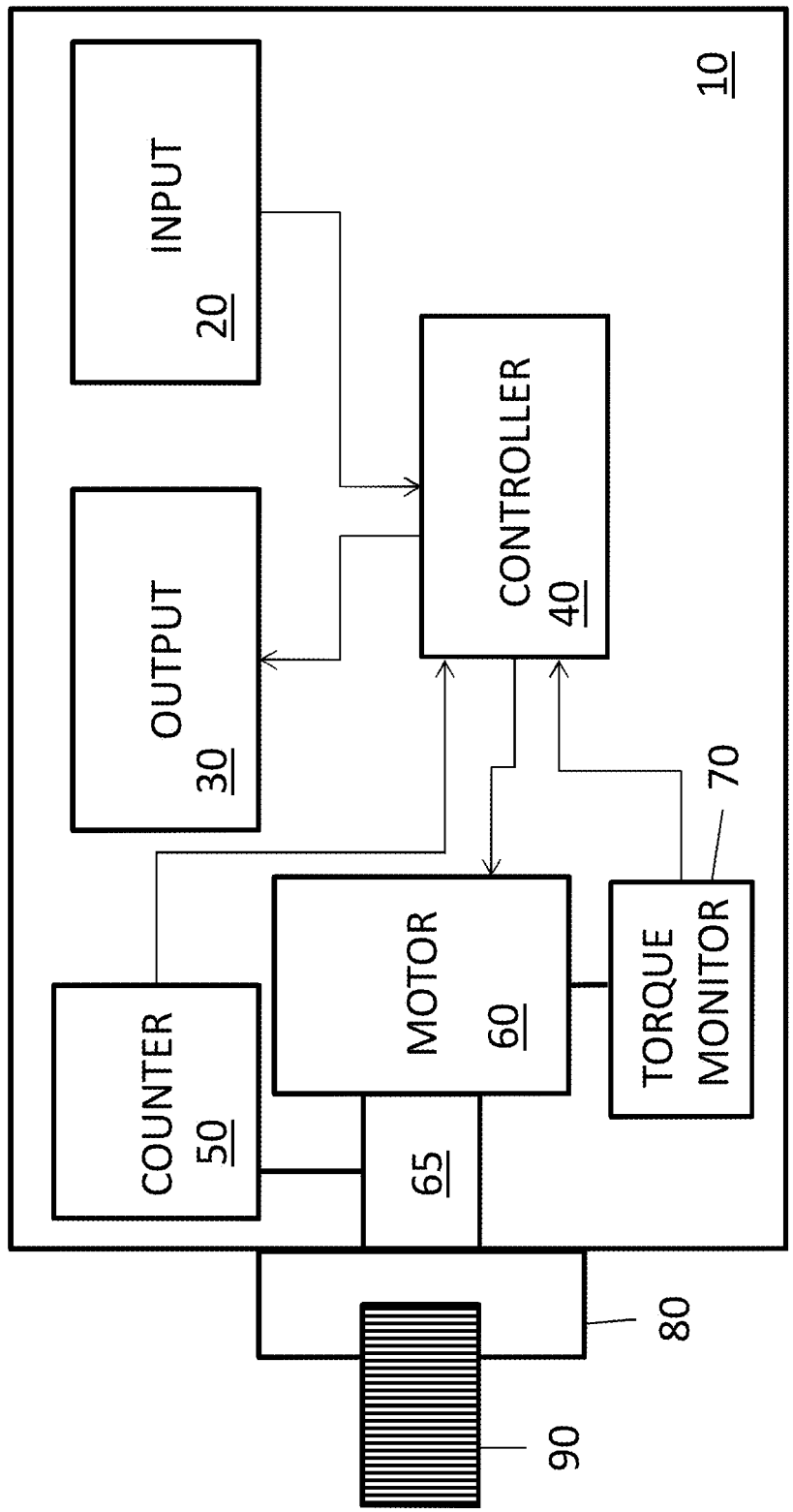
FIG. 3 is a block diagram of a thread gauge inspection apparatus.

FIG. 3 illustrates a block diagram of a thread gauge inspection apparatus 10. The thread gauge inspection apparatus 10 includes an input device 20 which enables the inputting of a specific turn count corresponding to inspection of a thread quality of a threaded hole or a threaded stud. The input device 20 may be a keypad, a set of buttons (one button corresponding to a ones unit value, a second button corresponding to a tens unit value, and a third button corresponding to a hundreds unit value), a set of dials (one dial corresponding to a ones unit value, a second dial corresponding to a tens unit value, and a third dial corresponding to a hundreds unit value), etc. It is noted that the input device receive the specific turn count optically, electrically, magnetically, manually, wirelessly.

An output device 30 communicates a result of the inspection of the thread quality of the threaded hole or the threaded stud. The output device 30 may also communicate, in real-time, the actual number of turns a reference thread gauge 90 is turned with respect to the threaded hole or threaded stud being inspected.

The output device 30 may be a LCD or LED display for displaying the result of the inspection and/or the actual number of turns. Moreover, the output device 30 may be a set of lights for displaying the result of the inspection (a green light corresponding to a passing status, a red light corresponding to a failing status, and/or yellow light corresponding to a need further consideration status).

The thread gauge inspection apparatus 10 includes a receiving member 80 to hold the reference thread gauge 90. A rotation device (electric motor) 60 bi-directionally rotates the reference thread gauge 90 through the receiving member 80 and a shaft 65. It is noted that rotation device (electric motor) 60 may be coupled directly to the receiving member 80, thereby eliminating the need for a shaft 65.

The rotation device (electric motor) 60 rotates the reference thread gauge 90 in a first direction to drive the reference thread gauge 90 into a threaded hole being inspected or onto a threaded stud being inspected.

The rotation device (electric motor) 60 rotates the reference thread gauge 90 in a second direction to drive the reference thread gauge 90 out of a threaded hole being inspected or off of a threaded stud being inspected.

The rotation device (electric motor) 60 may be a DC permanent magnet gear motor, which rotates the reference thread gauge 90 at a slow speed, such as, for example, 150 to 200 rpm, or other desired slow speed.

This type of motor has a torque constant expressed simply in terms of oz-in/amp or N-m/amp at the motor shaft. The torque at the output of the gear box (which spins the reference thread gauge 90) can be determined from current draw of the motor by simply reading the current, applying the torque constant, and multiplying by the reciprocal of the gearbox speed reduction ratio.

The thread gauge inspection apparatus 10 also includes a counter 50 that counts a number of turns the reference thread gauge 90 is rotated by the rotation device (electric motor) 60 in the first direction. The counter 50 may be an optical encoder coupled to the shaft 65 or receiving member 80.

The counter 50 may also be a mechanical encoder, an electrical encoder, or a magnetic encoder coupled to the shaft 65 or receiving member 80.

A torque monitoring device 70, operatively connected to the rotation device (electric motor) 60, monitors the torque produced by the rotation device (electric motor) 60 as the reference thread gauge 90 is rotated by the rotation device (electric motor) 60 in the first direction.

Examples of conventional torque monitoring devices are described in U.S. Pat. No. 7,661,196 and U.S. Pat. No. 7,941,932. The entire contents of U.S. Pat. No. 7,661,196 and U.S. Pat. No. 7,941,932 are hereby incorporated by reference.

Torque produced by the rotation device (electric motor) 60, as the reference thread gauge 90 is driven into a threaded hole being inspected or onto a threaded stud being inspected, is monitored. The torque may be monitored by monitoring the current drawn by the rotation device (electric motor) 60, which may be, for example, a DC permanent magnet gear motor. The current draw limit may be related to the predetermined torque limit by incorporating empirically determined gear box parameters, such as gear box ratio, gear box friction factor, and an additive factor in addition to the motor torque constant.

When a predetermined limit of torque is exceeded, the torque monitoring device 70 generates a signal indicating that the predetermined limit of torque has been exceeded. This signal is outputted to a controller 40.

The controller 40 may be a processor, microprocessor, an application specific integrated circuit, electronic circuitry, and/or combination thereof. The controller 40, is not, as is well known by those skilled in the art, purely software because software cannot by itself perform functions, but can only perform functions in conjunction with hardware.

The controller 40, when the monitored torque exceeds the predetermined limit, causes the rotation device (electric motor) 60 to stop rotating the reference thread gauge 90 in the first direction.

The controller 40, when the monitored torque exceeds the predetermined limit, also causes the counter 50 to stop counting the number of turns the reference thread gauge 90 is rotated by the rotation device (electric motor) 60 in the first direction. The controller 40 compares the count produced by the counter 50 with the inputted specific turn count.

The output device 30 may indicate, when the count produced by the counter 50 is equal to the inputted specific turn count, that the thread quality of the threaded hole or the threaded stud passed inspection.

The thread gauge inspection apparatus 10, when the count is less than the inputted specific turn count, may indicate that the thread quality of the threaded hole or the threaded stud failed inspection.

The thread gauge inspection apparatus 10, when the count is greater than the inputted specific turn count, may indicate that the thread quality of the threaded hole or the threaded stud failed inspection.

The thread gauge inspection apparatus 10, when the count is within a predetermined range, the predetermined range including the inputted specific turn count, may indicate that the thread quality of the threaded hole or the threaded stud passed inspection.

The thread gauge inspection apparatus 10, when the count is outside a predetermined range, the predetermined range including the inputted specific turn count, may indicate that the thread quality of the threaded hole or the threaded stud failed inspection.

The thread gauge inspection apparatus 10, when the count is less than a lower boundary value of a predetermined range, the predetermined range including the inputted specific turn count, may indicate the thread quality of the threaded hole or the threaded stud failed inspection.

The thread gauge inspection apparatus 10, when the count is greater than an upper boundary value of a predetermined range, the predetermined range including the inputted specific turn count, causes the output device to indicate the thread quality of the threaded hole or the threaded stud needs further consideration.

It is noted that that the thread gauge inspection apparatus 10 may include a means to manually rotate the reference thread gauge 90. In this example, the torque monitoring device is not needed as the technician can feel the torque.

In the manually rotated device, the determination of the status of the inspection can be automatic by the controller 40, upon receiving a signal that the rotations have stopped or be manually by the technician by comparing the displayed number of turns with a specified number of turns.

Figure 4:
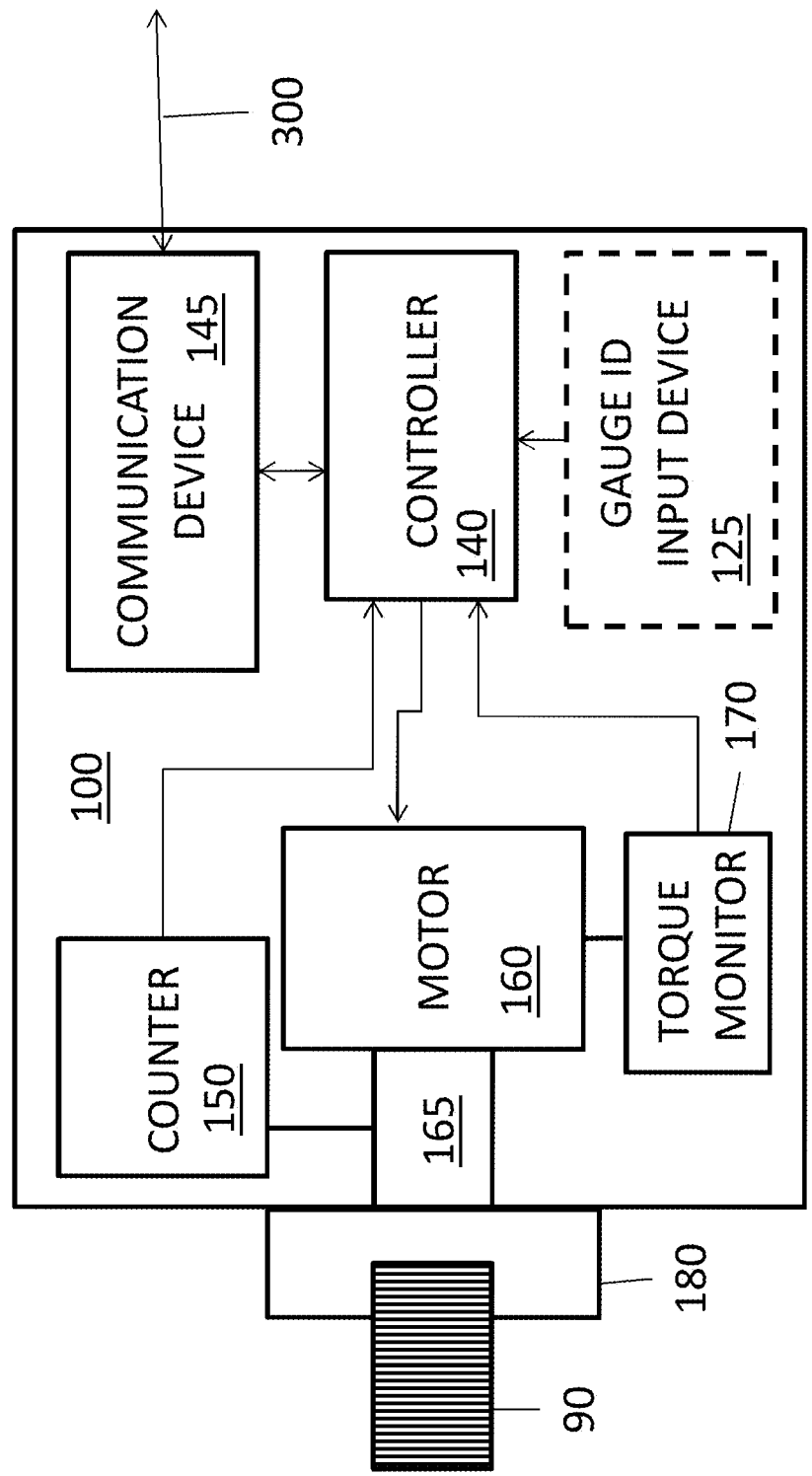
FIG. 4 is another block diagram of a thread gauge inspection apparatus.
Figure 5:
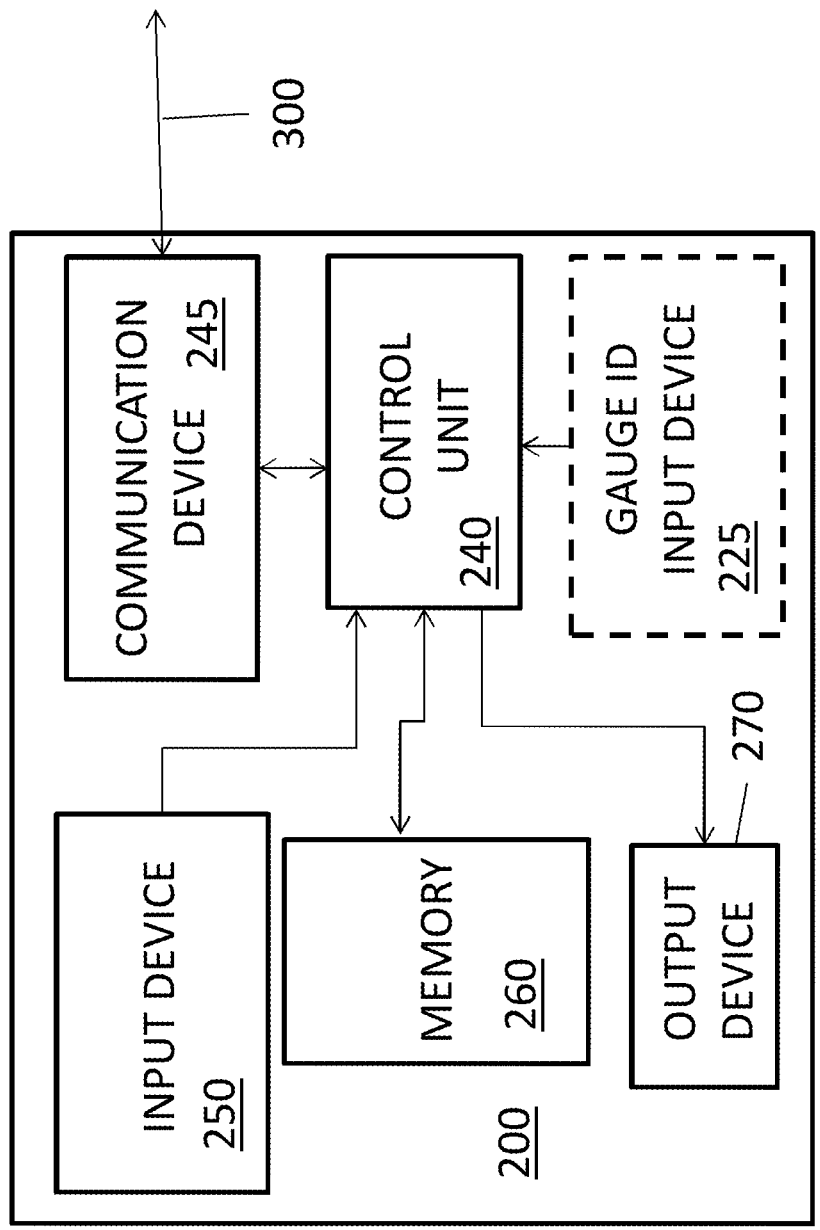
FIG. 5 is a block diagram of a control system used in conjunction with a thread gauge inspection apparatus.

FIGS. 4 and 5 illustrate a block diagram of a thread gauge inspection system, wherein FIG. 4 illustrates a thread gauge inspection apparatus 100 and FIG. 5 illustrates a thread gauge inspection control system 200.

The thread gauge inspection apparatus 100 of FIG. 4 includes a receiving member 180 to hold the reference thread gauge 90. A rotation device (electric motor) 160 bi-directionally rotates the reference thread gauge 90 through the receiving member 180 and a shaft 165. It is noted that rotation device (electric motor) 160 may be coupled directly to the receiving member 180, thereby eliminating the need for a shaft 165.

The rotation device (electric motor) 160 rotates the reference thread gauge 90 in a first direction to drive the reference thread gauge 90 into a threaded hole being inspected or onto a threaded stud being inspected.

The rotation device (electric motor) 160 rotates the reference thread gauge 90 in a second direction to drive the reference thread gauge 90 out of a threaded hole being inspected or off of a threaded stud being inspected.

The rotation device (electric motor) 160 may be a DC permanent magnet gear motor, which rotates the reference thread gauge 90 at a slow speed, such as, for example, 150 to 200 rpm, or other desired slow speed.

The thread gauge inspection apparatus 100 also includes a counter 150 that counts a number of turns the reference thread gauge 90 is rotated by the rotation device (electric motor) 160 in the first direction. The counter 150 may be an optical encoder coupled to the shaft 165 or receiving member 180.

The counter 150 may also be a mechanical encoder, an electrical encoder, or a magnetic encoder coupled to the shaft 165 or receiving member 180.

A torque monitoring device 170, operatively connected to the rotation device (electric motor) 160, monitors the torque produced by the rotation device (electric motor) 160 as the reference thread gauge 90 is rotated by the rotation device (electric motor) 160 in the first direction.

When a predetermined limit of torque is exceeded, the torque monitoring device 170 generates a signal indicating that the predetermined limit of torque has been exceeded. This signal is outputted to a controller 140.

The controller 140 may be a processor, microprocessor, an application specific integrated circuit, electronic circuitry, and/or combination thereof. The controller 140, is not, as is well known by those skilled in the art, purely software because software cannot by itself perform functions, but can only perform functions in conjunction with hardware.

The controller 140, when the monitored torque exceeds the predetermined limit, causes the rotation device (electric motor) 160 to stop rotating the reference thread gauge 90 in the first direction.

The controller 140, when the monitored torque exceeds the predetermined limit, also causes the counter 150 to stop counting the number of turns the reference thread gauge 90 is rotated by the rotation device (electric motor) 160 in the first direction. The controller 140 compares the count produced by the counter 150 with an inputted specific turn count.

The inputted specific turn count may be inputted through an input device as described with respect to FIG. 3, or the inputted specific turn count may be inputted through a communication device 145. The communication device 145 is in communication with communication device 245 of the thread gauge inspection control system 200 of FIG. 5. The communication devices 145 and 245 communicate over communication channel 300. Thus, the inputted specific turn count may be inputted through input device 250 of FIG. 5 and communicated to the thread gauge inspection apparatus 100.

Communication channel 300 may be a wired channel, a fiber channel, a wireless channel, or an optical channel.

In another embodiment, the controller 140, when the monitored torque exceeds the predetermined limit, causes the counter 150 to stop counting the number of turns the reference thread gauge 90 is rotated by the rotation device (electric motor) 160 in the first direction communicates the count produced by the counter 150 to the thread gauge inspection control system 200 of FIG. 5 for determining of inspection status.

The thread gauge inspection apparatus 100 may include an output device (not shown) to indicate, when the count produced by the counter 150 is equal to the inputted specific turn count, that the thread quality of the threaded hole or the threaded stud passed inspection. This output device may perform all the functions described with respect to the output device 30 of FIG. 3.

The thread gauge inspection apparatus 100 may also include a gauge identification input device 125 to enable a technician to input the identification of the reference thread gauge 90.

The gauge identification input device 125 may be a keypad for entering the numeric or alphanumeric identification of the reference thread gauge 90.

The gauge identification input device 125 may also be a barcode reader for reading a barcode containing the identification of the reference thread gauge 90. The barcode may be located on the reference thread gauge 90 or on a separate piece associated with the reference thread gauge 90.

The gauge identification input device 125 may be a magnetic or RFID reader for acquiring the identification of the reference thread gauge 90.

To identify the reference thread gauge 90, the reference thread gauge 90 may include human-readable numeric and/or alphanumeric markings thereon for the technician to read and enter into the system. The reference thread gauge 90 may include a barcode thereon to provide identification, a RFID to provide identification, a magnetic strip to provide identification, and/or physical features (key), which can be mechanically detected to provide identification.

As illustrated in FIG. 5, a thread gauge inspection control system 200 includes a control unit 240.

The control unit 240 may be a processor, microprocessor, an application specific integrated circuit, electronic circuitry, and/or combination thereof. The controller control unit 240, is not, as is well known by those skilled in the art, purely software because software cannot by itself perform functions, but can only perform functions in conjunction with hardware.

The thread gauge inspection control system 200 also includes an input device 250, which may be a keyboard, keypad, an electronic pointing device, a touch pad, a touchscreen, any other device and/or combination thereof for enabling input of data to the control unit 240. The input device 250 enables a technician to input a specified turn count to be utilized in the inspection process. The input device 250 may also enable a technician to input identification information relating to the reference thread gauge being used in the inspection process. Lastly, the input device 250 may enable a technician or user input other information or data relative to the inspection process to the thread gauge inspection control system 200.

The thread gauge inspection control system 200 includes an output device 250, which may be a display screen, a LED display, a LCD display, a printer, or any other device for enabling the outputting of data from the control unit 240.

The thread gauge inspection control system 200 includes a memory 260, which stores data and/or application software for the thread gauge inspection control system 200.

The thread gauge inspection control system 200 may also include a gauge identification input device 225 to enable a technician to input the identification of the reference thread gauge 90.

The gauge identification input device 225 may be a keypad for entering the numeric or alphanumeric identification of the reference thread gauge 90.

The gauge identification input device 225 may also be a barcode reader for reading a barcode containing the identification of the reference thread gauge 90. The barcode may be located on the reference thread gauge 90 or on a separate piece associated with the reference thread gauge 90.

The gauge identification input device 225 may be a magnetic or RFID reader for acquiring the identification of the reference thread gauge 90.

To identify the reference thread gauge 90, the reference thread gauge 90 may include human-readable numeric and/or alphanumeric markings thereon for the technician to read and enter into the system. The reference thread gauge 90 may include a barcode thereon to provide identification, a RFID to provide identification, a magnetic strip to provide identification, and/or physical features (key), which can be mechanically detected to provide identification.

Figure 6:
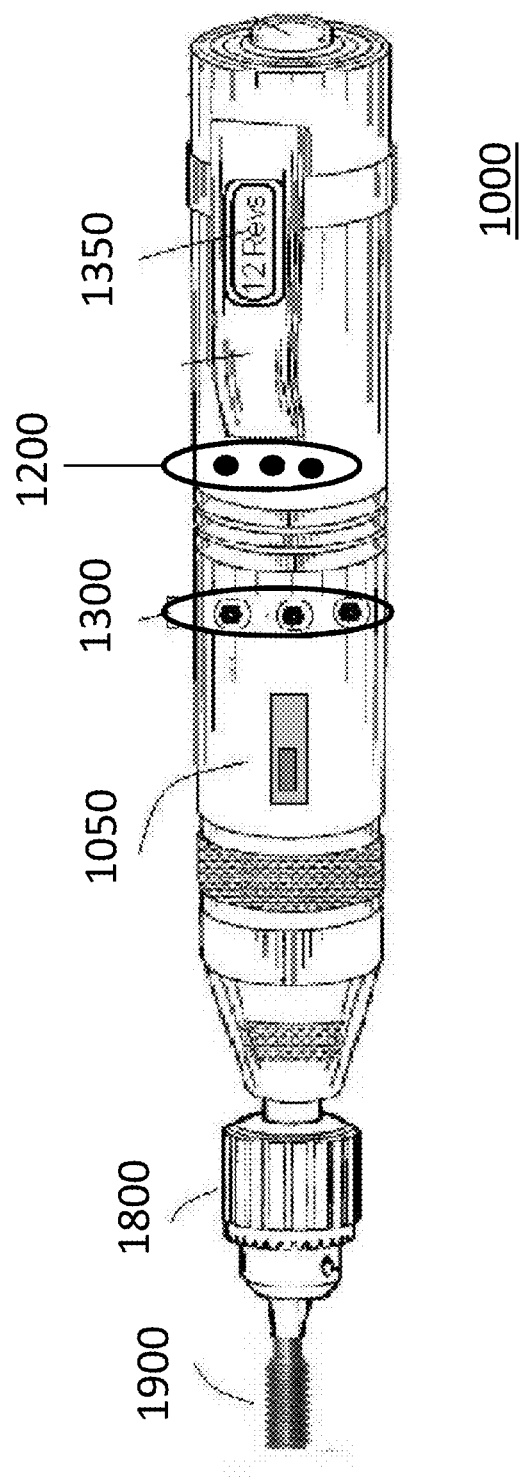
FIG. 6 is an overall drawing of a thread gauge inspection apparatus.

FIG. 6 illustrates a general view of a thread gauge inspection apparatus 1000. As illustrated in FIG. 6, reference thread gauge 1900 is removably coupled to chuck 1800 using a chuck key (not shown) to secure a shank of the reference thread gauge 1900 to a motorized driver (not shown).

An ON/OFF switch 1050 provides user manual control of starting and stopping the inspection process As noted above, the ability to attain the specified rotations of the reference thread gauge 1900 into a threaded bore is predicated on the quality and depth of the threads. In the case of a non-conforming thread, the torque required to turn the reference thread gauge 1900 exceeds the predetermined torque limit, and the rotation of the reference thread gauge 1900 is stopped.

As illustrated in FIG. 6, thread gauge inspection apparatus 1000 includes switches or buttons 1300, which serve to input the number of turns that must at least be accomplished for the test to be successful. A one's unit switch/button, a ten's unit switch/button, and hundred's switch/button, used in combination, allows a technician to input a specified revolution count to be utilized in the inspection process.

It is noted that the switches or buttons 1300 can have a dual operation such as a reset, clear and the like.

The thread gauge inspection apparatus 1000 may include a display 1350 is a visual output device which communicates the required (specified) turns (or the real time turn count when in use).

Display 1350 may display other information/data such as; remaining battery charge, motor torque, reference thread gauge ID, revolution direction, job number, number of tests run, date/time and any other information of potential interest to the operator, as well as quality assurance management.

The thread gauge inspection apparatus 1000 may also include a series of lights (displays) 1200, which convey the status of the inspection (a green light corresponding to a passing status, a red light corresponding to a failing status, and/or yellow light corresponding to a need further consideration status).

The thread gauge inspection apparatus 1000 may also include (not shown) a power source, which may be an internal rechargeable battery or power provide through an external wire.

It is noted that the integrated battery may be a removable battery pack to allow for the interchange of power packs while one is recharging.

The thread gauge inspection apparatus 1000 may also include (not shown) a power interface to allow the thread gauge inspection apparatus 1000 to be placed into a charging station when not in use.

Figure 7:
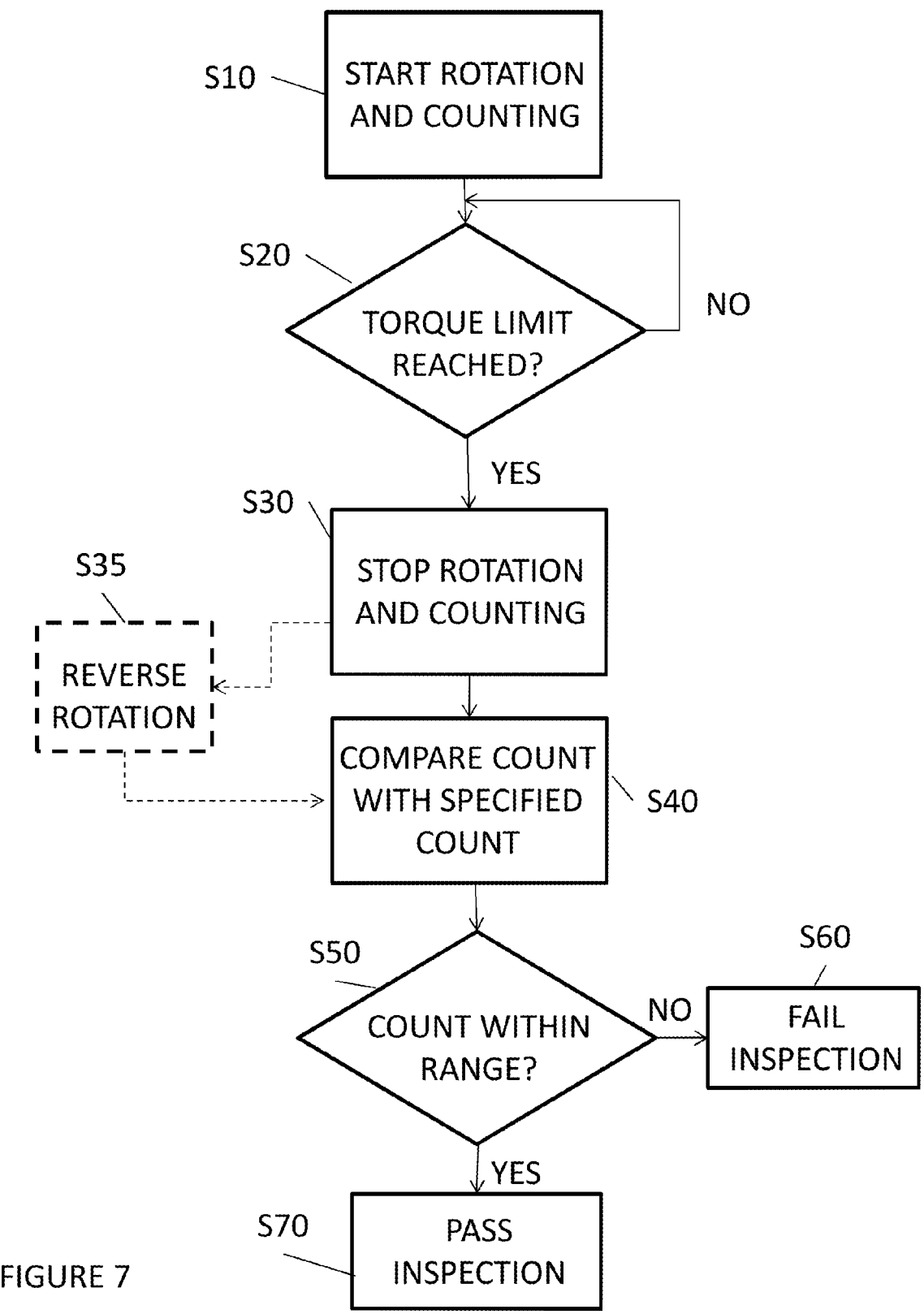
FIG. 7 is a flowchart of the operations of a thread gauge inspection apparatus.

FIG. 7 illustrates a flowchart showing a thread gauge inspection process. As illustrated in FIG. 7, a reference thread gauge begins rotating at step S10, the process of counting the number of turns that the reference thread gauge makes is started at step S10.

The rotating of reference thread gauge and the count process continues until step S20 determines (NO branch) that the torque on the reference thread gauge exceeds a predetermined limit.

As previously noted, the monitoring of the torque on a reference thread gauge is well known to those skilled in the art.

If step S20 determines (YES branch) that the torque on the reference thread gauge exceeds a predetermined limit, the rotating of reference thread gauge and the count process are stopped at step S30.

At step S40, the count generated by the count process is compared with a specified count. The specified count can be inputted into the process before the inspection process is started. The specified count is the value used to determine the inspection status of the threads under test.

Optionally, at step S35, the rotation of the reference thread gauge can be reversed to disengage the reference thread gauge from the thread under test.

At step S50, it is determined if the count generated by the count process is within a predetermined range of the specified count.

If the count generated by the count process is within a predetermined range of the specified count (YES branch), step S70 indicates that the thread under test passes inspection.

If the count generated by the count process is not within a predetermined range of the specified count (No branch), step S60 indicates that the thread under test failed inspection.

Figure 8:
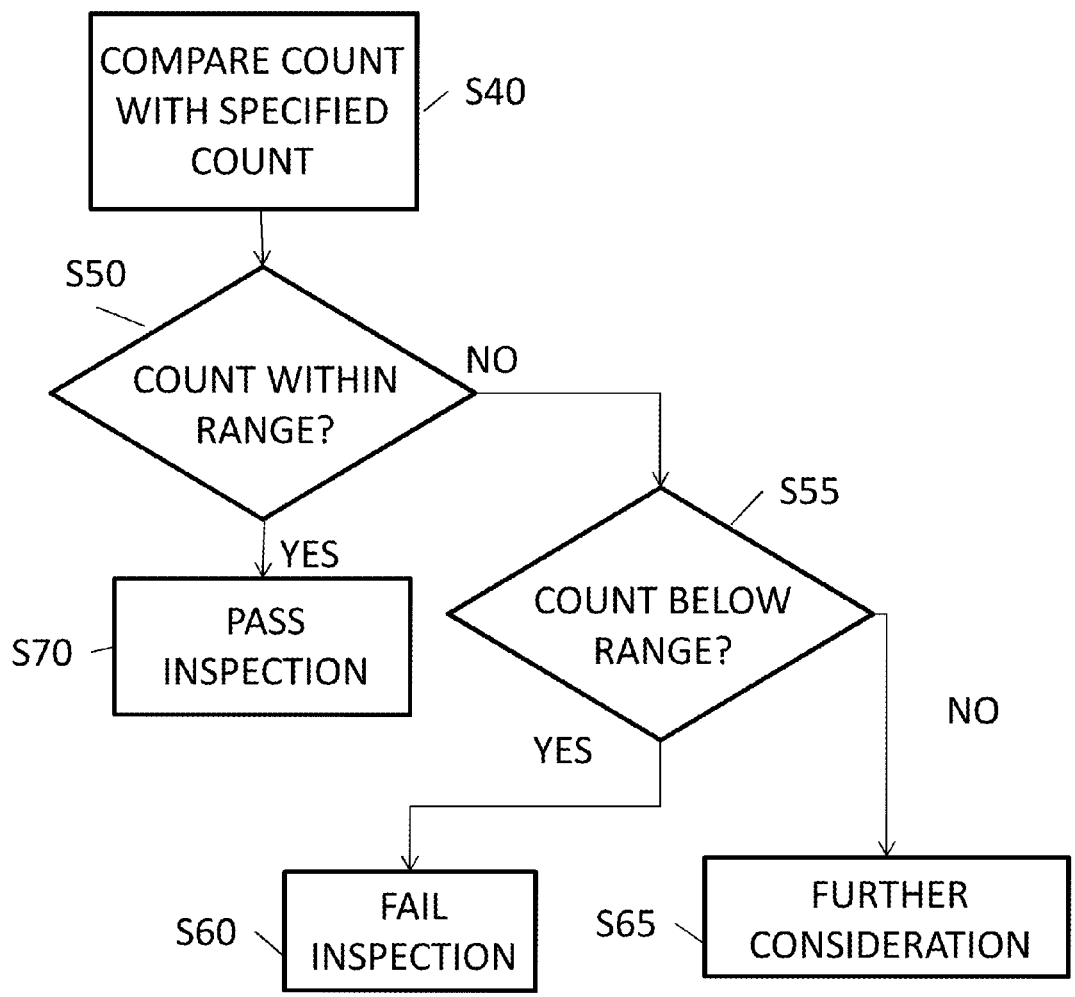
FIG. 8 is another flowchart of the operations of a thread gauge inspection apparatus.

FIG. 8 illustrates another flowchart showing an alternative inspection status determination. As illustrated in FIG. 8, at step S40, the count generated by the count process is compared with a specified count.

At step S50, it is determined if the count generated by the count process is within a predetermined range of the specified count.

If the count generated by the count process is within a predetermined range of the specified count (YES branch), step S70 indicates that the thread under test passes inspection.

If the count generated by the count process is not within a predetermined range of the specified count (No branch), step S55 determines if the count generated by the count process is below (less than) the predetermined range of the specified count.

If the count generated by the count process is below (less than) the predetermined range of the specified count (YES branch), step S60 indicates that the thread under test failed inspection.

If the count generated by the count process is not below (greater than) the predetermined range of the specified count (YES branch), step S65 indicates that the thread under test needs further consideration.

With respect to the range discussed above, an inspection process may consider a thread as passing inspection if the count value is +/− 0.5 turns of the specified turn count.

Thus, if the specified turn count is 6 turns, a count between 5.5 and 6.5 turns would trigger a pass inspection status, as illustrated in FIG. 8. However, in this example, a turn count of 5 would trigger a failed inspection status, as illustrated in FIG. 8.

In certain situations, a count less than the lower boundary of the specified count range is unacceptable, but a count greater than an upper boundary of the specified count range may be acceptable after further consideration or inspection, as illustrated in FIG. 8.

Figure 9:
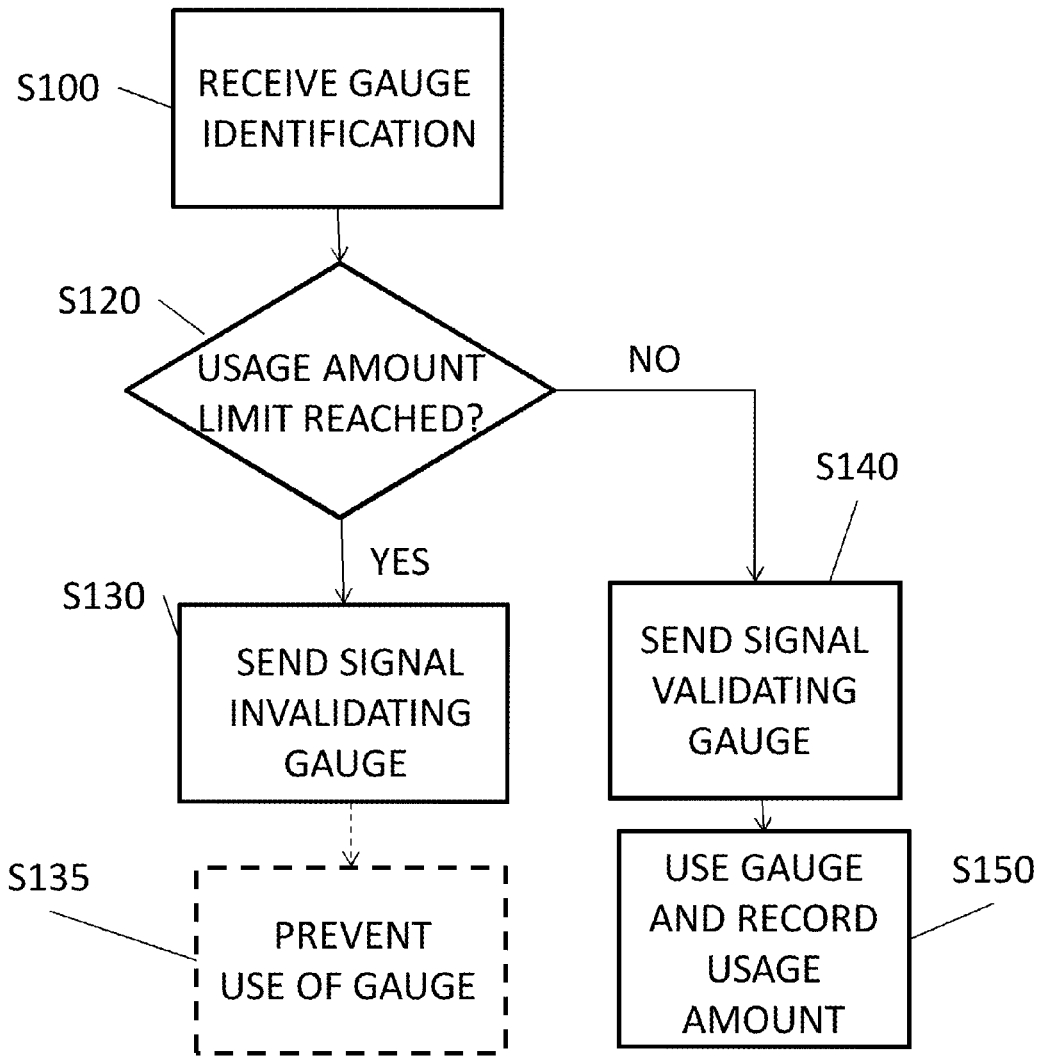
FIG. 9 is a flowchart for tracking the quality of the reference thread gauge.

FIG. 9 illustrates a flowchart for checking if the reference thread gauge can be utilized in the inspection process. As is known to those skilled in the art, reference thread gauges need to be periodically recalibrated due to wear from the inspection process. The process of FIG. 9 provides the monitoring of the usage of a reference thread gauge and determination if the reference thread gauge is needs calibration before use.

As illustrated in FIG. 9, at step S100, the identification of the reference thread gauge is received. The identification information is used to retrieve usage information from a database to determine, at step S120, if the usage amount for the identified reference thread gauge is below a predetermined usage limit, the predetermined usage limit corresponding to the upper usage amount before a reference thread gauge needs to be recalibrated.

If the identified reference thread gauge is below the predetermined usage limit (NO branch), step S140 generates a signal indicating that the identified reference thread gauge is usable.

This signal can be used to inform the technician of the status of the identified reference thread gauge or the signal can be used to enable the operation of a thread gauge inspection apparatus in conjunction with the identified reference thread gauge.

If the identified reference thread gauge is at or above the predetermined usage limit (YES branch), step S130 generates a signal indicating that the identified reference thread gauge is not usable.

This signal can be used to inform the technician of the status of the identified reference thread gauge or the signal can be used to disable the operation of a thread gauge inspection apparatus in conjunction with the identified reference thread gauge (step S135).

If the identified reference thread gauge is utilized in an inspection process, its usage tracked and recorded, at step S150. The usage amount may be conveyed back to a control system for entering into a database which identifies a reference thread gauge usage amount between calibrations.

By monitoring the identification of the reference thread gauge and its usage, a system can maintain appropriate quality control with respect to utilizing calibrated reference thread gauges and preventing the use of un-calibrated reference thread gauges.

Figure 10:
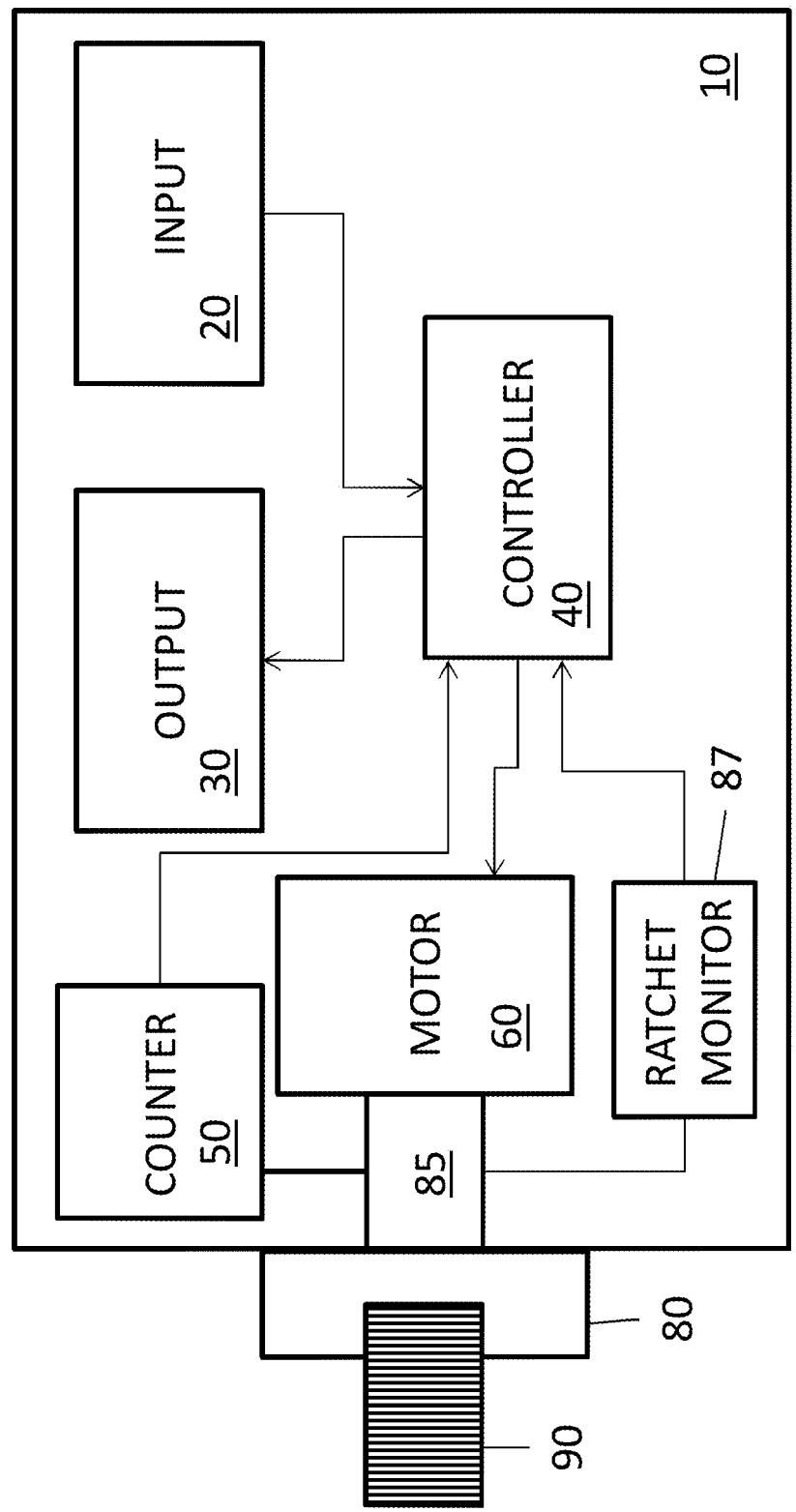
FIG. 10 is a block diagram of another embodiment of a thread gauge inspection apparatus.

FIG. 10 illustrates a block diagram of another embodiment of a thread gauge inspection apparatus 10. The thread gauge inspection apparatus 10 includes an input device 20 which enables the inputting of a specific turn count corresponding to inspection of a thread quality of a threaded hole or a threaded stud.

The input device 20 may be a keypad, a set of buttons (one button corresponding to a ones unit value, a second button corresponding to a tens unit value, and a third button corresponding to a hundreds unit value), a set of dials (one dial corresponding to a ones unit value, a second dial corresponding to a tens unit value, and a third dial corresponding to a hundreds unit value), etc. It is noted that the input device receive the specific turn count optically, electrically, magnetically, manually, wirelessly.

An output device 30 communicates a result of the inspection of the thread quality of the threaded hole or the threaded stud. The output device 30 may also communicate, in real-time, the actual number of turns a reference thread gauge 90 is turned with respect to the threaded hole or threaded stud being inspected. The output device 30 may be a LCD or LED display for displaying the result of the inspection and/or the actual number of turns. Moreover, the output device 30 may be a set of lights for displaying the result of the inspection (a green light corresponding to a passing status, a red light corresponding to a failing status, and/or yellow light corresponding to a need further consideration status).

The thread gauge inspection apparatus 10 includes a receiving member 80 to hold the reference thread gauge 90. A rotation device (electric motor) 60 bi-directionally rotates the reference thread gauge 90 through the receiving member 80 and a shaft/ratchet 85.

The rotation device (electric motor) 60 rotates the reference thread gauge 90 in a first direction to drive the reference thread gauge 90 into a threaded hole being inspected or onto a threaded stud being inspected.

The rotation device (electric motor) 60 rotates the reference thread gauge 90 in a second direction to drive the reference thread gauge 90 out of a threaded hole being inspected or off of a threaded stud being inspected.

The rotation device (electric motor) 60 may be a DC permanent magnet gear motor, which rotates the reference thread gauge 90 at a slow speed, such as, for example, 150 to 200 rpm, or other desired slow speed.

This type of motor has a torque constant expressed simply in terms of oz-in/amp or N-m/amp at the motor shaft. The torque at the output of the gear box (which spins the reference thread gauge 90) can be determined from current draw of the motor by simply reading the current, applying the torque constant, and multiplying by the reciprocal of the gearbox speed reduction ratio.

The thread gauge inspection apparatus 10 also includes a counter 50 that counts a number of turns the reference thread gauge 90 is rotated by the rotation device (electric motor) 60 in the first direction. The counter 50 may be an optical encoder coupled to the shaft/ratchet 85 or receiving member 80.

The counter 50 may also be a mechanical encoder, an electrical encoder, or a magnetic encoder coupled to the shaft/ratchet 85 or receiving member 80.

A ratchet monitoring device 87, operatively connected to the shaft/ratchet 85, monitors the ratcheting of the shaft/ratchet 85 as the reference thread gauge 90 is rotated by the rotation device (electric motor) 60 in the first direction.

When a predetermined limit of torque is exceeded, the shaft/ratchet 85 will begin to ratchet in that the rotation device (electric motor) 60 may continue to turn but the receiving member 80 or the reference thread gauge 90 will no longer turn. Upon sensing the ratcheting, the ratchet monitoring device 87 generates a signal indicating that the predetermined limit of torque has been exceeded. This signal is outputted to a controller 40.

The controller 40 may be a processor, microprocessor, an application specific integrated circuit, electronic circuitry, and/or combination thereof. The controller 40, is not, as is well known by those skilled in the art, purely software because software cannot by itself perform functions, but can only perform functions in conjunction with hardware.

The controller 40, when the monitored torque exceeds the predetermined limit, causes the rotation device (electric motor) 60 to stop rotating the reference thread gauge 90 in the first direction.

The controller 40, when the monitored torque exceeds the predetermined limit, also causes the counter 50 to stop counting the number of turns the reference thread gauge 90 is rotated by the rotation device (electric motor) 60 in the first direction. The controller 40 compares the count produced by the counter 50 with the inputted specific turn count.

The output device 30 may indicate, when the count produced by the counter 50 is equal to the inputted specific turn count, that the thread quality of the threaded hole or the threaded stud passed inspection.

The thread gauge inspection apparatus 10, when the count is less than the inputted specific turn count, may indicate that the thread quality of the threaded hole or the threaded stud failed inspection.

The thread gauge inspection apparatus 10, when the count is greater than the inputted specific turn count, may indicate that the thread quality of the threaded hole or the threaded stud failed inspection.

The thread gauge inspection apparatus 10, when the count is within a predetermined range, the predetermined range including the inputted specific turn count, may indicate that the thread quality of the threaded hole or the threaded stud passed inspection.

The thread gauge inspection apparatus 10, when the count is outside a predetermined range, the predetermined range including the inputted specific turn count, may indicate that the thread quality of the threaded hole or the threaded stud failed inspection.

The thread gauge inspection apparatus 10, when the count is less than a lower boundary value of a predetermined range, the predetermined range including the inputted specific turn count, may indicate the thread quality of the threaded hole or the threaded stud failed inspection.

The thread gauge inspection apparatus 10, when the count is greater than an upper boundary value of a predetermined range, the predetermined range including the inputted specific turn count, causes the output device to indicate the thread quality of the threaded hole or the threaded stud needs further consideration.

It is noted that that the thread gauge inspection apparatus 10 may include a means to manually rotate the reference thread gauge 90. In this example, the torque monitoring device is not needed as the technician can feel the torque.

In the manually rotated device, the determination of the status of the inspection can be automatic by the controller 40, upon receiving a signal that the rotations have stopped or be manually by the technician by comparing the displayed number of turns with a specified number of turns.

Figure 11:
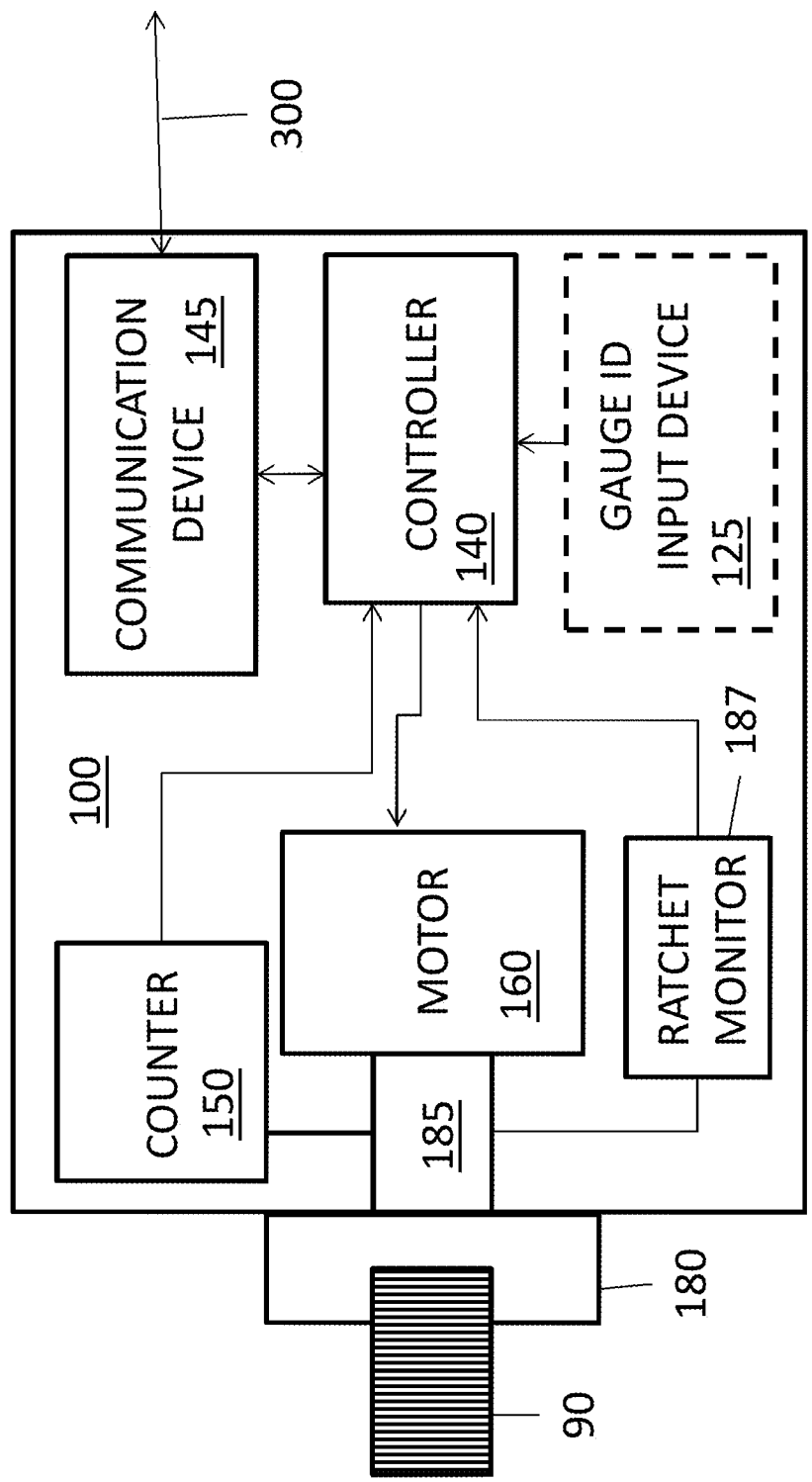
FIG. 11 is another block diagram of another embodiment of a thread gauge inspection apparatus.

FIG. 11 illustrates another embodiment of a thread gauge inspection apparatus 100.

The thread gauge inspection apparatus 100 of FIG. 11 includes a receiving member 180 to hold the reference thread gauge 90. A rotation device (electric motor) 160 bi-directionally rotates the reference thread gauge 90 through the receiving member 180 and a shaft/ratchet 185.

The rotation device (electric motor) 160 rotates the reference thread gauge 90 in a first direction to drive the reference thread gauge 90 into a threaded hole being inspected or onto a threaded stud being inspected.

The rotation device (electric motor) 160 rotates the reference thread gauge 90 in a second direction to drive the reference thread gauge 90 out of a threaded hole being inspected or off of a threaded stud being inspected.

The rotation device (electric motor) 160 may be a DC permanent magnet gear motor, which rotates the reference thread gauge 90 at a slow speed, such as, for example, 150 to 200 rpm, or other desired slow speed.

The thread gauge inspection apparatus 100 also includes a counter 150 that counts a number of turns the reference thread gauge 90 is rotated by the rotation device (electric motor) 160 in the first direction. The counter 150 may be an optical encoder coupled to the shaft/ratchet 185 or receiving member 180.

The counter 150 may also be a mechanical encoder, an electrical encoder, or a magnetic encoder coupled to the shaft/ratchet 185 or receiving member 180.

A ratchet monitoring device 187, operatively connected to the shaft/ratchet 185, monitors the ratcheting of the shaft/ratchet 185 as the reference thread gauge 90 is rotated by the rotation device (electric motor) 160 in the first direction.

When a predetermined limit of torque is exceeded, the shaft/ratchet 185 will begin to ratchet in that the rotation device (electric motor) 160 may continue to turn but the receiving member 180 or the reference thread gauge 90 will no longer turn. Upon sensing the ratcheting, the ratchet monitoring device 187 generates a signal indicating that the predetermined limit of torque has been exceeded. This signal is outputted to a controller 140.

The controller 140 may be a processor, microprocessor, an application specific integrated circuit, electronic circuitry, and/or combination thereof. The controller 140, is not, as is well known by those skilled in the art, purely software because software cannot by itself perform functions, but can only perform functions in conjunction with hardware.

The controller 140, when the monitored torque exceeds the predetermined limit, causes the rotation device (electric motor) 160 to stop rotating the reference thread gauge 90 in the first direction.

The controller 140, when the monitored torque exceeds the predetermined limit, also causes the counter 150 to stop counting the number of turns the reference thread gauge 90 is rotated by the rotation device (electric motor) 160 in the first direction. The controller 140 compares the count produced by the counter 150 with an inputted specific turn count.

The inputted specific turn count may be inputted through an input device as described with respect to FIG. 3 or 10, or the inputted specific turn count may be inputted through a communication device 145. The communication device 145 is in communication with communication device 245 of the thread gauge inspection control system 200 of FIG. 5. The communication devices 145 and 245 communicate over communication channel 300. Thus, the inputted specific turn count may be inputted through input device 250 of FIG. 5 and communicated to the thread gauge inspection apparatus 100.

Communication channel 300 may be a wired channel, a fiber channel, a wireless channel, or an optical channel.

In another embodiment, the controller 140, when the monitored torque exceeds the predetermined limit, causes the counter 150 to stop counting the number of turns the reference thread gauge 90 is rotated by the rotation device (electric motor) 160 in the first direction communicates the count produced by the counter 150 to the thread gauge inspection control system 200 of FIG. 5 for determining of inspection status.

The thread gauge inspection apparatus 100 may include an output device (not shown) to indicate, when the count produced by the counter 150 is equal to the inputted specific turn count, that the thread quality of the threaded hole or the threaded stud passed inspection. This output device may perform all the functions described with respect to the output device 30 of FIG. 3 or 10.

The thread gauge inspection apparatus 100 may also include a gauge identification input device 125 to enable a technician to input the identification of the reference thread gauge 90.

The gauge identification input device 125 may be a keypad for entering the numeric or alphanumeric identification of the reference thread gauge 90.

The gauge identification input device 125 may also be a barcode reader for reading a barcode containing the identification of the reference thread gauge 90. The barcode may be located on the reference thread gauge 90 or on a separate piece associated with the reference thread gauge 90.

The gauge identification input device 125 may be a magnetic or RFID reader for acquiring the identification of the reference thread gauge 90.

To identify the reference thread gauge 90, the reference thread gauge 90 may include human-readable numeric and/or alphanumeric markings thereon for the technician to read and enter into the system. The reference thread gauge 90 may include a barcode thereon to provide identification, a RFID to provide identification, a magnetic strip to provide identification, and/or physical features (key), which can be mechanically detected to provide identification.

Figure 12:
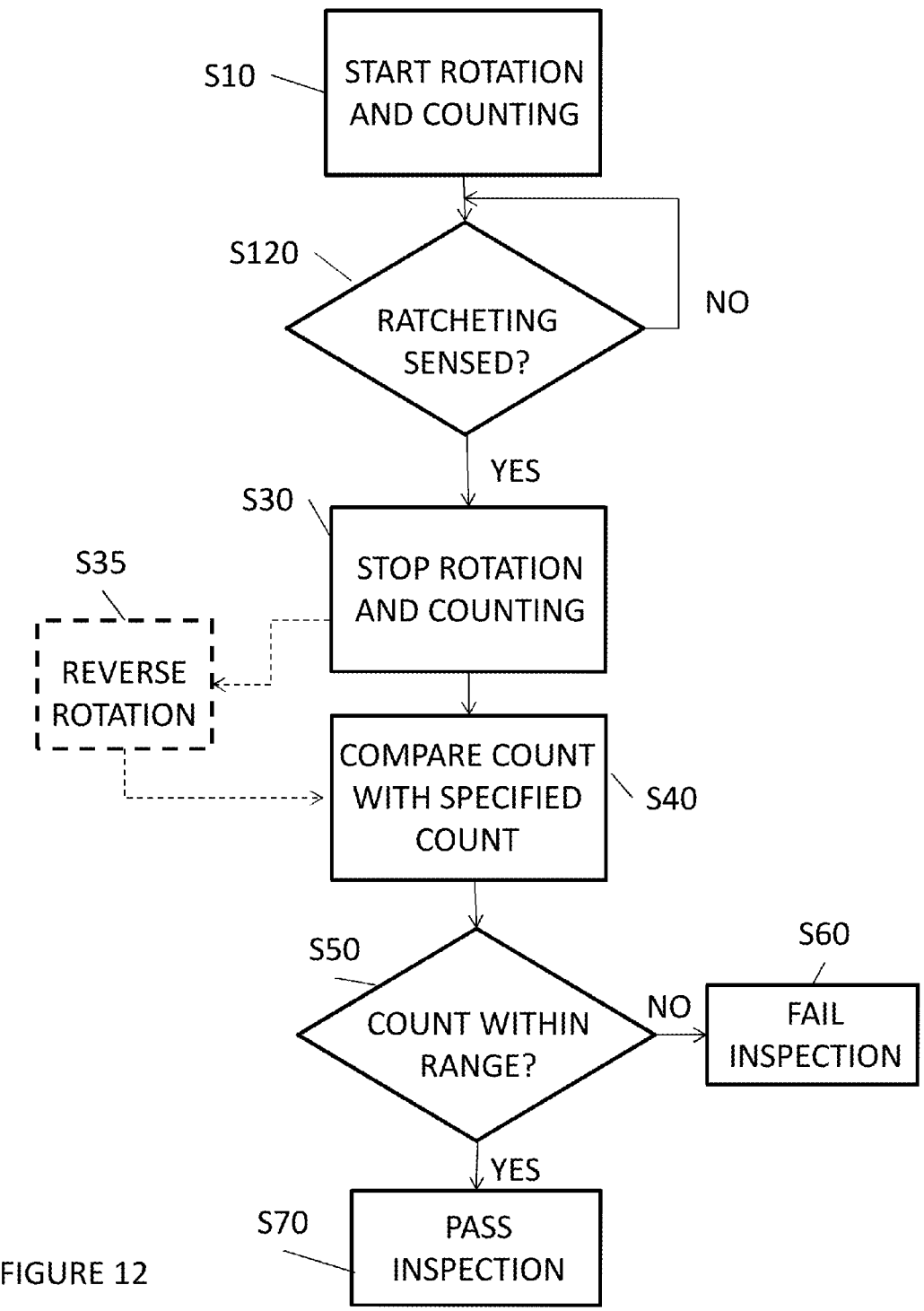
FIG. 12 is a flowchart of the operations of another embodiment of a thread gauge inspection apparatus.

FIG. 12 illustrates a flowchart showing another embodiment of a thread gauge inspection process. As illustrated in FIG. 12, a reference thread gauge begins rotating at step S10, the process of counting the number of turns that the reference thread gauge makes is started at step S10. The rotating of reference thread gauge and the count process continues until step S120 determines (NO branch) that the torque on the reference thread gauge exceeds a predetermined limit, by sensing ratcheting in the driving of the reference thread gauge.

If step S120 determines (YES branch) that the torque on the reference thread gauge exceeds a predetermined limit, the rotating of reference thread gauge and the count process are stopped at step S30.

At step S40, the count generated by the count process is compared with a specified count. The specified count can be inputted into the process before the inspection process is started. The specified count is the value used to determine the inspection status of the threads under test.

Optionally, at step S35, the rotation of the reference thread gauge can be reversed to disengage the reference thread gauge from the thread under test.

At step S50, it is determined if the count generated by the count process is within a predetermined range of the specified count.

If the count generated by the count process is within a predetermined range of the specified count (YES branch), step S70 indicates that the thread under test passes inspection.

If the count generated by the count process is not within a predetermined range of the specified count (No branch), step S60 indicates that the thread under test failed inspection.

As described above, a thread gauge inspection apparatus may include an input device to enable inputting of a specific turn count corresponding to inspection of a thread quality of a threaded hole or a threaded stud; an output device to communicate a result of the inspection of the thread quality of the threaded hole or the threaded stud; a receiving member to hold a reference thread gauge; a rotation device to bi-directionally rotate the reference thread gauge, the rotation device rotating the reference thread gauge in a first direction to drive the reference thread gauge into the threaded hole being inspected or onto the threaded stud being inspected; a counting device to count a number of turns the reference thread gauge is rotated by the rotation device in the first direction; a torque monitoring device to monitor the torque produced by the rotation device as the reference thread gauge is rotated by the rotation device in the first direction; and a controller operatively connected to the user input device, the rotation device, the counting device, and the torque monitoring device.

The controller, when the monitored torque exceeds a predetermined value, may cause the rotation device to stop rotating the reference thread gauge in the first direction.

The controller, when the monitored torque exceeds the predetermined value, may cause the counting device to stop counting the number of turns the reference thread gauge is rotated by the rotation device in the first direction.

The controller, when the monitored torque exceeds the predetermined value, may compare the count produced by the counting device with the inputted specific turn count.

The controller, when the count produced by the counting device is equal to the inputted specific turn count, may cause the output device to indicate the thread quality of the threaded hole or the threaded stud passed inspection.

The controller, when the count produced by the counting device is less than the inputted specific turn count, may cause the output device to indicate the thread quality of the threaded hole or the threaded stud failed inspection.

The controller, when the count produced by the counting device is greater than the inputted specific turn count, may cause the output device to indicate the thread quality of the threaded hole or the threaded stud failed inspection.

The controller, when the count produced by the counting device is within a predetermined range, the predetermined range including the inputted specific turn count, may cause the output device to indicate the thread quality of the threaded hole or the threaded stud passed inspection.

The controller, when the count produced by the counting device is outside a predetermined range, the predetermined range including the inputted specific turn count, may cause the output device to indicate the thread quality of the threaded hole or the threaded stud failed inspection.

The controller, when the count produced by the counting device is less than a lower boundary value of a predetermined range, the predetermined range including the inputted specific turn count, may cause the output device to indicate the thread quality of the threaded hole or the threaded stud failed inspection.

The controller, when the count produced by the counting device is greater than an upper boundary value of a predetermined range, the predetermined range including the inputted specific turn count, may cause the output device to indicate the thread quality of the threaded hole or the threaded stud needs further consideration.

The counting device may be an optical encoder, a mechanical encoder, an electrical encoder, or a magnetic encoder.

The output device may display, in real-time, the number of turns the reference thread gauge has been rotated by the rotation device in the first direction.

The controller, when the monitored torque exceeds a predetermined value, may cause the rotation device to stop rotating the reference thread gauge in the first direction and to rotate the reference thread gauge in a second direction to drive the reference thread gauge out of the threaded hole being inspected or off of the threaded stud being inspected.

A thread gauge inspection apparatus may include a receiving member to hold a reference thread gauge; a rotation device to bi-directionally rotate the reference thread gauge, the rotation device rotating the reference thread gauge in a first direction to drive the reference thread gauge into the threaded hole being inspected or onto the threaded stud being inspected; a counting device to count a number of turns the reference thread gauge is rotated by the rotation device in the first direction; and an output device to communicate, in real-time, the number of turns the reference thread gauge has been rotated by the rotation device in the first direction.

The thread gauge inspection apparatus may further include a torque monitoring device to monitor the torque produced by the rotation device as the reference thread gauge is rotated by the rotation device in the first direction; and a controller operatively connected to the rotation device and the torque monitoring device, the controller, when the monitored torque exceeds a predetermined value, causing the rotation device to stop rotating the reference thread gauge in the first direction.

The counting device may be an optical encoder, a mechanical encoder, an electrical encoder, or a magnetic encoder.

The controller, when the monitored torque exceeds a predetermined value, may cause the rotation device to stop rotating the reference thread gauge in the first direction and to rotate the reference thread gauge in a second direction to drive the reference thread gauge out of the threaded hole being inspected or off of the threaded stud being inspected.

A thread gauge inspection system may include a reference thread gauge having unique identification; a thread gauge inspection apparatus having a receiving member to hold the reference thread gauge, the thread gauge inspection apparatus acquiring the unique identification from the reference thread gauge; and a control system in operative communication with the thread gauge inspection apparatus.

The thread gauge inspection apparatus communicates the acquired unique identification from the reference thread gauge to the control system.

The control system determines the status of the identified reference thread gauge, the status of the identified reference thread gauge being either approved for inspecting the thread quality of a threaded hole or a threaded stud or not approved for inspecting the thread quality of the threaded hole or the threaded stud.

The control system communicates the determined status of the identified reference thread gauge to the thread gauge inspection apparatus.

The thread gauge inspection apparatus may include an input device to enable inputting the unique identification of the reference thread gauge.

The unique identification of the reference thread gauge may be machine readable.

The thread gauge inspection apparatus may include an input device to enable reading of the unique identification of the reference thread gauge.

The thread gauge inspection apparatus may enter into an inoperative state when the receiving member holds the identified reference thread gauge and the control system communicates the determined status of the identified reference thread gauge is not approved for inspecting the thread quality of the threaded hole or the threaded stud.

The thread gauge inspection apparatus displays that the determined status of the identified reference thread gauge may not be approved for inspecting the thread quality of the threaded hole or the threaded stud when the control system communicates the determined status of the identified reference thread gauge is not approved for inspecting the thread quality of the threaded hole or the threaded stud.

The thread gauge inspection apparatus may include a controller, wherein the controller tracks a usage amount the identified reference thread gauge is used during an inspection process. The thread gauge inspection apparatus communicates the tracked usage amount of the identified reference thread gauge to the control system. The control system processes the communicated the tracked usage amount to maintain a usage history of the identified reference thread gauge and determines the status of the identified reference thread gauge based upon the maintained usage history of the identified reference thread gauge.

The thread gauge inspection apparatus may include a rotation device to bi-directionally rotate the identified reference thread gauge, the rotation device rotating the identified reference thread gauge in a first direction to drive the identified reference thread gauge into the threaded hole being inspected or onto the threaded stud being inspected.

The thread gauge inspection apparatus may include a counting device to count a number of turns the identified reference thread gauge is rotated by the rotation device in the first direction, the count being the tracked usage amount that the thread gauge inspection apparatus communicates to the control system.

A thread gauge inspection system may include a reference thread gauge; a thread gauge inspection apparatus having a receiving member to hold the reference thread gauge; and a control system in operative communication with the thread gauge inspection apparatus.

The thread gauge inspection apparatus may include an input device to enable inputting of a specific turn count corresponding to inspection of a thread quality of a threaded hole or a threaded stud, an output device to communicate a result of the inspection of the thread quality of the threaded hole or the threaded stud, a receiving member to hold a reference thread gauge, a rotation device to bi-directionally rotate the reference thread gauge, the rotation device rotating the reference thread gauge in a first direction to drive the reference thread gauge into the threaded hole being inspected or onto the threaded stud being inspected, a counting device to count a number of turns the reference thread gauge is rotated by the rotation device in the first direction, a torque monitoring device to monitor the torque produced by the rotation device as the reference thread gauge is rotated by the rotation device in the first direction, and a controller operatively connected to the user input device, the rotation device, the counting device, and the torque monitoring device.

The controller, when the monitored torque exceeds a predetermined value, causes the rotation device to stop rotating the reference thread gauge in the first direction. The controller, when the monitored torque exceeds the predetermined value, causes the counting device to stop counting the number of turns the reference thread gauge is rotated by the rotation device in the first direction.

The controller, when the monitored torque exceeds the predetermined value, compares the count produced by the counting device with the inputted specific turn count. The controller, when the count produced by the counting device is equal to the inputted specific turn count, causes the output device to indicate the thread quality of the threaded hole or the threaded stud passed inspection.

The thread gauge inspection apparatus communicates to the control system, when the count produced by the counting device is equal to the inputted specific turn count, information indicating that the thread quality of the threaded hole or the threaded stud passed inspection.

The control system stores the information received from the thread gauge inspection apparatus.

The controller, when the count produced by the counting device is less than the inputted specific turn count, may cause the output device to indicate the thread quality of the threaded hole or the threaded stud failed inspection The thread gauge inspection apparatus may communicate to the control system, when the count produced by the counting device is less than the inputted specific turn count, information indicating that the thread quality of the threaded hole or the threaded stud failed inspection.

The controller, when the count produced by the counting device is greater than the inputted specific turn count, may cause the output device to indicate the thread quality of the threaded hole or the threaded stud failed inspection.

The thread gauge inspection apparatus communicates to the control system, when the count produced by the counting device is greater than the inputted specific turn count, information indicating that the thread quality of the threaded hole or the threaded stud failed inspection.

The controller, when the count produced by the counting device is within a predetermined range, the predetermined range including the inputted specific turn count, may cause the output device to indicate the thread quality of the threaded hole or the threaded stud passed inspection.

The thread gauge inspection apparatus communicates to the control system, when the count produced by the counting device is within a predetermined range, the predetermined range including the inputted specific turn count, information indicating that the thread quality of the threaded hole or the threaded stud passed inspection.

The controller, when the count produced by the counting device is outside a predetermined range, the predetermined range including the inputted specific turn count, may cause the output device to indicate the thread quality of the threaded hole or the threaded stud failed inspection.

The thread gauge inspection apparatus communicates to the control system, when the count produced by the counting device is outside a predetermined range, the predetermined range including the inputted specific turn count, information indicating that the thread quality of the threaded hole or the threaded stud failed inspection.

The controller, when the count produced by the counting device is less than a lower boundary value of a predetermined range, the predetermined range including the inputted specific turn count, may cause the output device to indicate the thread quality of the threaded hole or the threaded stud failed inspection.

The thread gauge inspection apparatus communicates to the control system, when the count produced by the counting device is less than a lower boundary value of a predetermined range, the predetermined range including the inputted specific turn count, information indicating that the thread quality of the threaded hole or the threaded stud failed inspection.

The reference thread gauge may have unique identification. The thread gauge inspection apparatus acquires the unique identification from the reference thread gauge and communicates the acquired unique identification from the reference thread gauge to the control system. The control system determines the status of the identified reference thread gauge, the status of the identified reference thread gauge being either approved for inspecting the thread quality of a threaded hole or a threaded stud or not approved for inspecting the thread quality of the threaded hole or the threaded stud. The control system communicates the determined status of the identified reference thread gauge to the thread gauge inspection apparatus.

The thread gauge inspection apparatus may include an input device to enable inputting the unique identification of the reference thread gauge.

The unique identification of the reference thread gauge may be machine readable.

The thread gauge inspection apparatus may include an input device to enable reading of the unique identification of the reference thread gauge.

The thread gauge inspection apparatus may enter into an inoperative state when the receiving member holds the identified reference thread gauge and the control system communicates the determined status of the identified reference thread gauge is not approved for inspecting the thread quality of the threaded hole or the threaded stud.

The thread gauge inspection apparatus may display that the determined status of the identified reference thread gauge is not approved for inspecting the thread quality of the threaded hole or the threaded stud when the control system communicates the determined status of the identified reference thread gauge is not approved for inspecting the thread quality of the threaded hole or the threaded stud.

The thread gauge inspection apparatus may include a controller. The controller tracks a usage amount the identified reference thread gauge is used during an inspection process. The thread gauge inspection apparatus communicates the tracked usage amount of the identified reference thread gauge to the control system. The control system processes the communicated the tracked usage amount to maintain a usage history of the identified reference thread gauge. The control system determines the status of the identified reference thread gauge based upon the maintained usage history of the identified reference thread gauge.

The thread gauge inspection apparatus may include a rotation device to bi-directionally rotate the identified reference thread gauge, the rotation device rotating the identified reference thread gauge in a first direction to drive the identified reference thread gauge into the threaded hole being inspected or onto the threaded stud being inspected.

A thread gauge inspection apparatus may include a rotation device to bi-directionally rotate a reference thread gauge, the rotation device rotating the reference thread gauge in a first direction; a counting device to count a number of turns the reference thread gauge is rotated by the rotation device; and an output device to communicate the counted number of turns the reference thread gauge is rotated by the rotation device as a result of an inspection of a thread quality of a machined thread.

The counting device may count a number of turns the reference thread gauge is rotated by the rotation device in the first direction, the first direction being a clockwise direction.

The counting device may count a number of turns the reference thread gauge is rotated by the rotation device in a second direction, the second direction being a counter-clockwise direction.

The thread gauge inspection apparatus may include a torque monitoring device to monitor the torque produced by the rotation device as the reference thread gauge is rotated by the rotation device in the first direction, the torque monitoring device causing the rotation device to stop rotating the reference thread gauge in the first direction when the monitored torque exceeds a predetermined value.

The thread gauge inspection apparatus may include a torque monitoring device to monitor the torque produced by the rotation device as the reference thread gauge is rotated by the rotation device in the first direction; and a clutch mechanism operatively connected between the rotation device and the reference thread gauge, the torque monitoring device causing the clutch mechanism to disengage the reference thread gauge from the rotation device when the monitored torque exceeds a predetermined value.

The thread gauge inspection apparatus may include a ratcheting mechanism to cause the reference thread gauge to stop rotating in the first direction when a torque produced by the rotation device exceeds a predetermined value.

The counting device may be an optical encoder, a mechanical encoder, an electrical encoder, and/or a magnetic encoder.

The output device may display, in real-time, the number of turns the reference thread gauge has been rotated by the rotation device in the first direction.

The output device may display, in real-time, the number of turns the reference thread gauge has been rotated by the rotation device in the second direction.

The torque monitoring device, when the monitored torque exceeds a predetermined value, may cause the rotation device to stop rotating the reference thread gauge in the first direction and to rotate the reference thread gauge in a second direction.

The thread gauge inspection apparatus may include a receiving member to hold the reference thread gauge, the receiving member being operatively coupled to the rotation device.

The thread gauge inspection apparatus may include a receiving member to hold the reference thread gauge, the receiving member being operatively coupled to the clutch mechanism.

The thread gauge inspection apparatus may include a receiving member to hold the reference thread gauge, the receiving member being operatively coupled to the ratcheting mechanism.

The output device may visually indicate that the rotation device has stopped rotating the reference thread gauge in the first direction.

The output device may visually indicate that the ratcheting mechanism has caused the reference thread gauge to stop rotating.

The output device may audibly indicate that the rotation device has stopped rotating the reference thread gauge in the first direction.

The output device may audibly indicate that the ratcheting mechanism has caused the reference thread gauge to stop rotating.

A thread gauge inspection apparatus may include an input device to enable inputting of a specific turn count corresponding to inspection of a thread quality of a machined thread; an output device to communicate a result of the inspection of the thread quality of the machined thread; a rotation device to bi-directionally rotate the reference thread gauge, the rotation device rotating the reference thread gauge in a first direction; a counting device to count a number of turns the reference thread gauge is rotated by the rotation device; a torque monitoring device to monitor the torque produced by the rotation device as the reference thread gauge is rotated by the rotation device in the first direction; and a controller operatively connected to the input device, the rotation device, the counting device, and the torque monitoring device. The controller, when the monitored torque exceeds a predetermined value, causes the rotation device to stop rotating the reference thread gauge in the first direction. The controller compares the count produced by the counting device with the inputted specific turn count. The controller, when the count produced by the counting device is equal to the inputted specific turn count, causes the output device to indicate the thread quality of the machined thread passed inspection.

The controller, when the count produced by the counting device is less than the inputted specific turn count, may cause the output device to indicate the thread quality of the machined thread failed inspection.

The controller, when the count produced by the counting device is greater than the inputted specific turn count, may cause the output device to indicate the thread quality of the machined thread failed inspection.

The controller, when the count produced by the counting device is within a predetermined range, the predetermined range including the inputted specific turn count, may cause the output device to indicate the thread quality of the machined thread passed inspection.

The controller, when the count produced by the counting device is outside a predetermined range, the predetermined range including the inputted specific turn count, may cause the output device to indicate the thread quality of the machined thread failed inspection.

The controller, when the count produced by the counting device is less than a lower boundary value of a predetermined range, the predetermined range including the inputted specific turn count, may cause the output device to indicate the thread quality of the machined thread failed inspection.

The controller, when the count produced by the counting device is greater than an upper boundary value of a predetermined range, the predetermined range including the inputted specific turn count, may cause the output device to indicate the thread quality of the machined thread needs further consideration.

The counting device may be an optical encoder, a mechanical encoder, an electrical encoder, and/or a magnetic encoder.

The output device may display, in real-time, the number of turns the reference thread gauge has been rotated by the rotation device in the first direction.

The counting device may count the number of turns the reference thread gauge is rotated by the rotation device in the first direction.

The controller, when the monitored torque exceeds a predetermined value, may cause the rotation device to stop rotating the reference thread gauge in the first direction and to rotate the reference thread gauge in a second direction.

The counting device may count the number of turns the reference thread gauge is rotated by the rotation device in the second direction.

The counting device may count the number of turns the reference thread gauge is rotated by the rotation device in the first direction, the count produced by the counting device being equal to an average between the number of turns the reference thread gauge is rotated by the rotation device in the first direction and the number of turns the reference thread gauge is rotated by the rotation device in the second direction.

The output device may display, in real-time, the number of turns the reference thread gauge has been rotated by the rotation device in the second direction.

The thread gauge inspection apparatus may include a receiving member to hold the reference thread gauge, the receiving member being operatively coupled to the rotation device.

The thread gauge inspection apparatus may include a receiving member to hold the reference thread gauge; and a clutch mechanism operatively connected between the rotation device and the receiving member. The controller causes the clutch mechanism to disengage the receiving member from the rotation device when the monitored torque exceeds a predetermined value.

The output device may visually indicate that the rotation device has stopped rotating the reference thread gauge in the first direction.

The output device may audibly indicate that the rotation device has stopped rotating the reference thread gauge in the first direction.

A thread gauge inspection apparatus includes an input device to enable inputting of a specific turn count corresponding to inspection of a thread quality of a machined thread; an output device to communicate a result of the inspection of the thread quality of the machined thread; a rotation device to bi-directionally rotate the reference thread gauge, the rotation device rotating the reference thread gauge in a first direction to drive the reference thread gauge into the machined thread being inspected; a counting device to count a number of turns the reference thread gauge is rotated by the rotation device; a ratcheting mechanism to cause the reference thread gauge to stop rotating in the first direction when a torque produced by the rotation device exceeds a predetermined value; and a controller operatively connected to the input device, the rotation device, the counting device, and the torque monitoring device. The controller, when the monitored torque exceeds a predetermined value, causes the rotation device to stop rotating the reference thread gauge in the first direction. The controller compares the count produced by the counting device with the inputted specific turn count. The controller, when the count produced by the counting device is equal to the inputted specific turn count, causes the output device to indicate the thread quality of the machined thread passed inspection.

The controller, when the count produced by the counting device is less than the inputted specific turn count, may cause the output device to indicate the thread quality of the machined thread failed inspection.

The controller, when the count produced by the counting device is greater than the inputted specific turn count, may cause the output device to indicate the thread quality of the machined thread failed inspection.

The controller, when the count produced by the counting device is within a predetermined range, the predetermined range including the inputted specific turn count, may cause the output device to indicate the thread quality of the machined thread passed inspection.

The controller, when the count produced by the counting device is outside a predetermined range, the predetermined range including the inputted specific turn count, may cause the output device to indicate the thread quality of the machined thread failed inspection.

The controller, when the count produced by the counting device is less than a lower boundary value of a predetermined range, the predetermined range including the inputted specific turn count, may cause the output device to indicate the thread quality of the machined thread failed inspection.

The controller, when the count produced by the counting device is greater than an upper boundary value of a predetermined range, the predetermined range including the inputted specific turn count, may cause the output device to indicate the thread quality of the machined thread needs further consideration.

The counting device may be an optical encoder, a mechanical encoder, an electrical encoder, and/or a magnetic encoder.

The output device may display, in real-time, the number of turns the reference thread gauge has been rotated by the rotation device in the first direction.

The counting device may count the number of turns the reference thread gauge is rotated by the rotation device in the first direction.

The controller, when the ratcheting mechanism causes the reference thread gauge to stop rotating in the first direction, may cause the rotation device to rotate the reference thread gauge in a second direction.

The counting device may count the number of turns the reference thread gauge is rotated by the rotation device in the second direction.

The counting device may count the number of turns the reference thread gauge is rotated by the rotation device in the first direction, the count produced by the counting device being equal to an average between the number of turns the reference thread gauge is rotated by the rotation device in the first direction and the number of turns the reference thread gauge is rotated by the rotation device in the second direction.

The output device may display, in real-time, the number of turns the reference thread gauge has been rotated by the rotation device in the second direction.

The thread gauge inspection apparatus may include a receiving member to hold the reference thread gauge, the receiving member being operatively coupled to the ratcheting mechanism.

The output device may visually indicate that the ratcheting mechanism has caused the reference thread gauge to stop rotating.

The output device may audibly indicate that the ratcheting mechanism has caused the reference thread gauge to stop rotating.

A thread gauge inspection apparatus includes an input device to enable inputting of a specific turn count corresponding to inspection of a thread quality of a machined thread; an output device to communicate a result of the inspection of the thread quality of the machined thread; a receiving member to hold a reference thread gauge; a rotation device to bi-directionally rotate the reference thread gauge, the rotation device rotating the reference thread gauge in a first direction; a counting device to count a number of turns the reference thread gauge is rotated by the rotation device; a torque monitoring device to monitor the torque produced by the rotation device as the reference thread gauge is rotated by the rotation device in the first direction; and a controller operatively connected to the input device, the rotation device, the counting device, and the torque monitoring device. The controller, when the monitored torque exceeds a predetermined value, causes the rotation device to stop rotating the reference thread gauge in the first direction. The controller, when the monitored torque exceeds the predetermined value, compares the count produced by the counting device with the inputted specific turn count. The controller, when the count produced by the counting device is equal to the inputted specific turn count, causes the output device to indicate the thread quality of the machined thread passed inspection.

The controller, when the count produced by the counting device is less than the inputted specific turn count, may cause the output device to indicate the thread quality of the machined thread failed inspection.

The controller, when the count produced by the counting device is greater than the inputted specific turn count, may cause the output device to indicate the thread quality of the machined thread failed inspection.

The controller, when the count produced by the counting device is within a predetermined range, the predetermined range including the inputted specific turn count, may cause the output device to indicate the thread quality of the machined thread passed inspection.

The controller, when the count produced by the counting device is outside a predetermined range, the predetermined range including the inputted specific turn count, may cause the output device to indicate the thread quality of the machined thread failed inspection.

The controller, when the count produced by the counting device is less than a lower boundary value of a predetermined range, the predetermined range including the inputted specific turn count, may cause the output device to indicate the thread quality of the machined thread failed inspection.

The controller, when the count produced by the counting device is greater than an upper boundary value of a predetermined range, the predetermined range including the inputted specific turn count, may cause the output device to indicate the thread quality of the machined thread needs further consideration.

The counting device may be an optical encoder, a mechanical encoder, an electrical encoder, and/or a magnetic encoder.

The output device may display, in real-time, the number of turns the reference thread gauge has been rotated by the rotation device in the first direction.

The controller, when the monitored torque exceeds a predetermined value, may cause the rotation device to stop rotating the reference thread gauge in the first direction and to rotate the reference thread gauge in a second direction.

The counting device may count a number of turns the reference thread gauge is rotated by the rotation device in the second direction.

The counting device may count a number of turns the reference thread gauge is rotated by the rotation device in the first direction.

A thread gauge inspection apparatus includes a receiving member to hold a reference thread gauge; a rotation device to bi-directionally rotate the reference thread gauge, the rotation device rotating the reference thread gauge in a first direction; a counting device to count a number of turns the reference thread gauge is rotated by the rotation device; and an output device to communicate, in real-time, the number of turns the reference thread gauge has been rotated by the rotation device in the first direction.

The thread gauge inspection apparatus may include a torque monitoring device to monitor the torque produced by the rotation device as the reference thread gauge is rotated by the rotation device in the first direction; and a controller operatively connected to the rotation device and the torque monitoring device. The controller, when the monitored torque exceeds a predetermined value, causes the rotation device to stop rotating the reference thread gauge in the first direction.

The counting device may be an optical encoder, a mechanical encoder, an electrical encoder, and/or a magnetic encoder.

The controller, when the monitored torque exceeds a predetermined value, may cause the rotation device to stop rotating the reference thread gauge in the first direction and to rotate the reference thread gauge in a second direction.

The counting device may count a number of turns the reference thread gauge is rotated by the rotation device in the second direction.

The counting device may count a number of turns the reference thread gauge is rotated by the rotation device in the first direction.

A thread gauge inspection system includes a reference thread gauge having unique identification; a thread gauge inspection apparatus having a receiving member to hold the reference thread gauge; and a control system in operative communication with the thread gauge inspection apparatus. The control system determines the status of the identified reference thread gauge, the status of the identified reference thread gauge being either approved for inspecting the thread quality of a machined thread or not approved for inspecting the thread quality of the machined thread. The control system communicates the determined status of the identified reference thread gauge to the thread gauge inspection apparatus.

The thread gauge inspection apparatus may include an input device to enable inputting the unique identification of the reference thread gauge.

The control system may include an input device to enable inputting the unique identification of the reference thread gauge.

The unique identification of the reference thread gauge may be machine readable.

The thread gauge inspection apparatus may include an input device to enable reading of the unique identification of the reference thread gauge.

The control system may include an input device to enable reading of the unique identification of the reference thread gauge.

The thread gauge inspection apparatus may enter into an inoperative state when the receiving member holds the identified reference thread gauge and the control system communicates the determined status of the identified reference thread gauge is not approved for inspecting the thread quality of the machined thread.

The thread gauge inspection apparatus may visually display that the determined status of the identified reference thread gauge is not approved for inspecting the thread quality of the machined thread when the control system communicates the determined status of the identified reference thread gauge is not approved for inspecting the thread quality of the machined thread.

The thread gauge inspection apparatus may audibly indicate that the determined status of the identified reference thread gauge is not approved for inspecting the thread quality of the machined thread when the control system communicates the determined status of the identified reference thread gauge is not approved for inspecting the thread quality of the machined thread.

The thread gauge inspection apparatus may include a controller. The controller tracks a usage amount the identified reference thread gauge is used during an inspection process. The thread gauge inspection apparatus communicates the tracked usage amount of the identified reference thread gauge to the control system. The control system processes the communicated the tracked usage amount to maintain a usage history of the identified reference thread gauge. The control system determines the status of the identified reference thread gauge based upon the maintained usage history of the identified reference thread gauge.

The thread gauge inspection apparatus may include a rotation device to bi-directionally rotate the identified reference thread gauge. The thread gauge inspection apparatus may include a counting device to count a number of turns the identified reference thread gauge is rotated by the rotation device, the count being the tracked usage amount that the thread gauge inspection apparatus communicates to the control system.

The control system may wirelessly communicate with the thread gauge inspection apparatus.

The unique identification may be realized by a radio frequency identification device in the reference thread gauge.

The unique identification may be realized by optically scannable markings on the reference thread gauge.

The unique identification may include information identifying specifications of the reference thread gauge.

The control system may reset the status of the identified reference thread gauge to approved for inspecting after the identified reference thread gauge has been re-calibrated.

A thread gauge inspection system includes a reference thread gauge having unique identification; and a thread gauge inspection apparatus having a receiving member to hold the reference thread gauge, the thread gauge inspection apparatus acquiring the unique identification from the reference thread gauge. The thread gauge inspection apparatus includes a controller to manage a status of the reference thread gauge and an output device. The controller receives the acquired unique identification from the reference thread gauge. The controller determines the status of the identified reference thread gauge, the status of the identified reference thread gauge being either approved for inspecting the thread quality of a machined thread or not approved for inspecting the thread quality of the machined thread. The output device indicates the determined status of the identified reference thread gauge.

The thread gauge inspection apparatus may include an input device to enable inputting the unique identification of the reference thread gauge.

The unique identification of the reference thread gauge may be machine readable.

The thread gauge inspection apparatus may include an input device to enable reading of the unique identification of the reference thread gauge.

The thread gauge inspection apparatus may enter into an inoperative state when the receiving member holds the identified reference thread gauge and the controller determines the identified reference thread gauge is not approved for inspecting the thread quality of the machined thread.

The thread gauge inspection apparatus may visually display that the determined status of the identified reference thread gauge is not approved for inspecting the thread quality of the machined thread when the controller determines the identified reference thread gauge is not approved for inspecting the thread quality of the machined thread.

The thread gauge inspection apparatus may audibly indicate that the determined status of the identified reference thread gauge is not approved for inspecting the thread quality of the machined thread when the controller determines the identified reference thread gauge is not approved for inspecting the thread quality of the machined thread.

The controller may track a usage amount the identified reference thread gauge is used during an inspection process. The controller processes the tracked usage amount to maintain a usage history of the identified reference thread gauge. The controller determines the status of the identified reference thread gauge based upon the maintained usage history of the identified reference thread gauge.

The thread gauge inspection apparatus may include a rotation device to bi-directionally rotate the identified reference thread gauge. The thread gauge inspection apparatus includes a counting device to count a number of turns the identified reference thread gauge is rotated by the rotation device, the count being the tracked usage amount.

The unique identification may be realized by a radio frequency identification device in the reference thread gauge.

The unique identification may be realized by optically scannable markings on the reference thread gauge.

The unique identification may include information identifying specifications of the reference thread gauge.

The controller may reset the status of the identified reference thread gauge to approved for inspecting after the identified reference thread gauge has been re-calibrated.

A thread gauge inspection system includes a reference thread gauge having unique identification; a thread gauge inspection apparatus having a receiving member to hold the reference thread gauge; and a control system in operative communication with the thread gauge inspection apparatus. the thread gauge inspection apparatus includes a rotation device to bi-directionally rotate a reference thread gauge, the rotation device rotating the reference thread gauge, a counting device to count a number of turns the reference thread gauge is rotated by the rotation device, and an output device to communicate the counted number of turns the reference thread gauge is rotated by the rotation device as a result of an inspection of a thread quality of a machined thread. The control system determines the status of the reference thread gauge, the status of the reference thread gauge being either approved for inspecting the thread quality of a machined thread or not approved for inspecting the thread quality of the machined thread. The control system communicates the determined status of the reference thread gauge to the thread gauge inspection apparatus.

The counting device may count a number of turns the reference thread gauge is rotated by the rotation device in the first direction, the first direction being a clockwise direction.

The counting device may count a number of turns the reference thread gauge is rotated by the rotation device in a second direction, the second direction being a counter-clockwise direction.

The thread gauge inspection apparatus may include a torque monitoring device to monitor the torque produced by the rotation device as the reference thread gauge is rotated by the rotation device in the first direction, the torque monitoring device causing the rotation device to stop rotating the reference thread gauge in the first direction when the monitored torque exceeds a predetermined value.

The thread gauge inspection apparatus may include a ratcheting mechanism to cause the reference thread gauge to stop rotating in the first direction when a torque produced by the rotation device exceeds a predetermined value.

The output device may display, in real-time, the number of turns the reference thread gauge has been rotated by the rotation device.

The torque monitoring device, when the monitored torque exceeds a predetermined value, may cause the rotation device to stop rotating the reference thread gauge in the first direction and to rotate the reference thread gauge in a second direction.

The thread gauge inspection apparatus may include a controller. The controller, when the monitored torque exceeds a predetermined value, causes the rotation device to stop rotating the reference thread gauge in the first direction. The controller, when the monitored torque exceeds the predetermined value, cause the counting device to stop counting the number of turns the reference thread gauge is rotated by the rotation device. The controller, when the monitored torque exceeds the predetermined value, compares the count produced by the counting device with an inputted specific turn count. The controller, when the count produced by the counting device is equal to the inputted specific turn count, causes the output device to indicate the thread quality of the machined thread passed inspection.

The thread gauge inspection apparatus may communicate to the control system, when the count produced by the counting device is equal to the inputted specific turn count, information indicating that the thread quality of the machined thread passed inspection. The control system stores the information received from the thread gauge inspection apparatus.

The controller, when the count produced by the counting device is less than the inputted specific turn count, may cause the output device to indicate the thread quality of the machined thread failed inspection. The thread gauge inspection apparatus communicates to the control system, when the count produced by the counting device is less than the inputted specific turn count, information indicating that the thread quality of the machined thread failed inspection.

The controller, when the count produced by the counting device is greater than the inputted specific turn count, may cause the output device to indicate the thread quality of the machined thread failed inspection. The thread gauge inspection apparatus communicates to the control system, when the count produced by the counting device is greater than the inputted specific turn count, information indicating that the thread quality of the machined thread failed inspection.

The controller, when the count produced by the counting device is within a predetermined range, the predetermined range including the inputted specific turn count, may cause the output device to indicate the thread quality of the machined thread passed inspection. The thread gauge inspection apparatus communicates to the control system, when the count produced by the counting device is within a predetermined range, the predetermined range including the inputted specific turn count, information indicating that the thread quality of the machined thread passed inspection.

The controller, when the count produced by the counting device is outside a predetermined range, the predetermined range including the inputted specific turn count, may cause the output device to indicate the thread quality of the machined thread failed inspection. The thread gauge inspection apparatus communicates to the control system, when the count produced by the counting device is outside a predetermined range, the predetermined range including the inputted specific turn count, information indicating that the thread quality of the machined thread failed inspection.

The controller, when the count produced by the counting device is less than a lower boundary value of a predetermined range, the predetermined range including the inputted specific turn count, may cause the output device to indicate the thread quality of the machined thread failed inspection. The thread gauge inspection apparatus communicates to the control system, when the count produced by the counting device is less than a lower boundary value of a predetermined range, the predetermined range including the inputted specific turn count, information indicating that the thread quality of the machined thread failed inspection.

The thread gauge inspection apparatus may include an input device to enable inputting the unique identification of the reference thread gauge.

The unique identification of the reference thread gauge may be machine readable.

The thread gauge inspection apparatus may include an input device to enable reading of the unique identification of the reference thread gauge.

The control system may include an input device to enable inputting the unique identification of the reference thread gauge.

The thread gauge inspection apparatus may enter into an inoperative state when the receiving member holds the reference thread gauge and the control system communicates the determined status of the reference thread gauge is not approved for inspecting the thread quality of the machined thread.

The thread gauge inspection apparatus may display that the determined status of the reference thread gauge is not approved for inspecting the thread quality of the machined thread when the control system communicates the determined status of the reference thread gauge is not approved for inspecting the thread quality of the machined thread.

The thread gauge inspection apparatus may include a controller. The controller tracks a usage amount the reference thread gauge is used during an inspection process. The thread gauge inspection apparatus communicates the tracked usage amount of the reference thread gauge to the control system. The control system processes the communicated the tracked usage amount to maintain a usage history of the reference thread gauge. The control system determines the status of the reference thread gauge based upon the maintained usage history of the reference thread gauge.

The count may be the tracked usage amount that the thread gauge inspection apparatus communicates to the control system.

A thread gauge inspection system includes a reference thread gauge having unique identification; and a thread gauge inspection apparatus having a receiving member to hold the reference thread gauge; and a control system in operative communication with the thread gauge inspection apparatus. The thread gauge inspection apparatus includes an input device to enable inputting of a specific turn count corresponding to inspection of a thread quality of a machined thread, an output device to communicate a result of the inspection of the thread quality of the machined thread, a rotation device to bi-directionally rotate the reference thread gauge, the rotation device rotating the reference thread gauge in a first direction, a counting device to count a number of turns the reference thread gauge is rotated by the rotation device, a torque monitoring device to monitor the torque produced by the rotation device as the reference thread gauge is rotated by the rotation device in the first direction, and a controller operatively connected to the input device, the rotation device, the counting device, and the torque monitoring device. The controller, when the monitored torque exceeds a predetermined value, causes the rotation device to stop rotating the reference thread gauge in the first direction. The controller compares the count produced by the counting device with the inputted specific turn count. The controller, when the count produced by the counting device is equal to the inputted specific turn count, causes the output device to indicate the thread quality of the machined thread passed inspection. The control system determines the status of the reference thread gauge, the status of the reference thread gauge being either approved for inspecting the thread quality of a machined thread or not approved for inspecting the thread quality of the machined thread. The control system communicates the determined status of the reference thread gauge to the thread gauge inspection apparatus.

The counting device may count a number of turns the reference thread gauge is rotated by the rotation device in the first direction, the first direction being a clockwise direction.

The counting device may count a number of turns the reference thread gauge is rotated by the rotation device in a second direction, the second direction being a counter-clockwise direction.

The output device may display, in real-time, the number of turns the reference thread gauge has been rotated by the rotation device.

The torque monitoring device, when the monitored torque exceeds a predetermined value, may cause the rotation device to stop rotating the reference thread gauge in the first direction and to rotate the reference thread gauge in a second direction.

The thread gauge inspection apparatus may communicate to the control system, when the count produced by the counting device is equal to the inputted specific turn count, information indicating that the thread quality of the machined thread passed inspection. The control system stores the information received from the thread gauge inspection apparatus.

The controller, when the count produced by the counting device is less than the inputted specific turn count, may cause the output device to indicate the thread quality of the machined thread failed inspection. The thread gauge inspection apparatus communicates to the control system, when the count produced by the counting device is less than the inputted specific turn count, information indicating that the thread quality of the machined thread failed inspection.

The controller, when the count produced by the counting device is greater than the inputted specific turn count, may cause the output device to indicate the thread quality of the machined thread failed inspection. The thread gauge inspection apparatus communicates to the control system, when the count produced by the counting device is greater than the inputted specific turn count, information indicating that the thread quality of the machined thread failed inspection.

The controller, when the count produced by the counting device is within a predetermined range, the predetermined range including the inputted specific turn count, may cause the output device to indicate the thread quality of the machined thread passed inspection. The thread gauge inspection apparatus communicates to the control system, when the count produced by the counting device is within a predetermined range, the predetermined range including the inputted specific turn count, information indicating that the thread quality of the machined thread passed inspection.

The controller, when the count produced by the counting device is outside a predetermined range, the predetermined range including the inputted specific turn count, may cause the output device to indicate the thread quality of the machined thread failed inspection. The thread gauge inspection apparatus communicates to the control system, when the count produced by the counting device is outside a predetermined range, the predetermined range including the inputted specific turn count, information indicating that the thread quality of the machined thread failed inspection.

The controller, when the count produced by the counting device is less than a lower boundary value of a predetermined range, the predetermined range including the inputted specific turn count, may cause the output device to indicate the thread quality of the machined thread failed inspection. The thread gauge inspection apparatus communicates to the control system, when the count produced by the counting device is less than a lower boundary value of a predetermined range, the predetermined range including the inputted specific turn count, information indicating that the thread quality of the machined thread failed inspection.

The unique identification of the reference thread gauge may be machine readable.

The thread gauge inspection apparatus may include an input device to enable reading of the unique identification of the reference thread gauge.

The control system may include an input device to enable inputting the unique identification of the reference thread gauge.

The thread gauge inspection apparatus may enter into an inoperative state when the receiving member holds the reference thread gauge and the control system communicates the determined status of the reference thread gauge is not approved for inspecting the thread quality of the machined thread.

The thread gauge inspection apparatus may display that the determined status of the reference thread gauge is not approved for inspecting the thread quality of the machined thread when the control system communicates the determined status of the reference thread gauge is not approved for inspecting the thread quality of the machined thread.

The controller may track a usage amount the reference thread gauge is used during an inspection process. The thread gauge inspection apparatus communicates the tracked usage amount of the reference thread gauge to the control system. The control system processes the communicated the tracked usage amount to maintain a usage history of the reference thread gauge. The control system determines the status of the reference thread gauge based upon the maintained usage history of the reference thread gauge.

The count may be the tracked usage amount that the thread gauge inspection apparatus communicates to the control system.

A thread gauge inspection system includes a reference thread gauge having unique identification; a thread gauge inspection apparatus having a receiving member to hold the reference thread gauge; and a control system in operative communication with the thread gauge inspection apparatus. The thread gauge inspection apparatus includes an input device to enable inputting of a specific turn count corresponding to inspection of a thread quality of a machined thread, an output device to communicate a result of the inspection of the thread quality of the machined thread, a rotation device to bi-directionally rotate the reference thread gauge, the rotation device rotating the reference thread gauge in a first direction to drive the reference thread gauge into the threaded hole being inspected or onto the threaded stud being inspected, a counting device to count a number of turns the reference thread gauge is rotated by the rotation device, a ratcheting mechanism to cause the reference thread gauge to stop rotating in the first direction when a torque produced by the rotation device exceeds a predetermined value, and a controller operatively connected to the input device, the rotation device, the counting device, and the torque monitoring device. The controller, when the monitored torque exceeds a predetermined value, causes the rotation device to stop rotating the reference thread gauge. The controller compares the count produced by the counting device with the inputted specific turn count. The controller, when the count produced by the counting device is equal to the inputted specific turn count, causes the output device to indicate the thread quality of the machined thread passed inspection. The control system determines the status of the reference thread gauge, the status of the reference thread gauge being either approved for inspecting the thread quality of a machined thread or not approved for inspecting the thread quality of the machined thread. The control system communicates the determined status of the reference thread gauge to the thread gauge inspection apparatus.

The counting device may count a number of turns the reference thread gauge is rotated by the rotation device in the first direction, the first direction being a clockwise direction.

The counting device may count a number of turns the reference thread gauge is rotated by the rotation device in a second direction, the second direction being a counter-clockwise direction.

The output device may display, in real-time, the number of turns the reference thread gauge has been rotated by the rotation device.

The thread gauge inspection apparatus may communicate to the control system, when the count produced by the counting device is equal to the inputted specific turn count, information indicating that the thread quality of the machined thread passed inspection. The control system stores the information received from the thread gauge inspection apparatus.

The controller, when the count produced by the counting device is less than the inputted specific turn count, may cause the output device to indicate the thread quality of the machined thread failed inspection. The thread gauge inspection apparatus communicates to the control system, when the count produced by the counting device is less than the inputted specific turn count, information indicating that the thread quality of the machined thread failed inspection.

The controller, when the count produced by the counting device is greater than the inputted specific turn count, may cause the output device to indicate the thread quality of the machined thread failed inspection. The thread gauge inspection apparatus communicates to the control system, when the count produced by the counting device is greater than the inputted specific turn count, information indicating that the thread quality of the machined thread failed inspection.

The controller, when the count produced by the counting device is within a predetermined range, the predetermined range including the inputted specific turn count, may cause the output device to indicate the thread quality of the machined thread passed inspection. The thread gauge inspection apparatus communicates to the control system, when the count produced by the counting device is within a predetermined range, the predetermined range including the inputted specific turn count, information indicating that the thread quality of the machined thread passed inspection.

The controller, when the count produced by the counting device is outside a predetermined range, the predetermined range including the inputted specific turn count, may cause the output device to indicate the thread quality of the machined thread failed inspection. The thread gauge inspection apparatus communicates to the control system, when the count produced by the counting device is outside a predetermined range, the predetermined range including the inputted specific turn count, information indicating that the thread quality of the machined thread failed inspection.

The controller, when the count produced by the counting device is less than a lower boundary value of a predetermined range, the predetermined range including the inputted specific turn count, may cause the output device to indicate the thread quality of the machined thread failed inspection. The thread gauge inspection apparatus communicates to the control system, when the count produced by the counting device is less than a lower boundary value of a predetermined range, the predetermined range including the inputted specific turn count, information indicating that the thread quality of the machined thread failed inspection.

The unique identification of the reference thread gauge may be machine readable.

The thread gauge inspection apparatus may include an input device to enable reading of the unique identification of the reference thread gauge.

The control system may include an input device to enable inputting the unique identification of the reference thread gauge.

The thread gauge inspection apparatus may enter into an inoperative state when the receiving member holds the reference thread gauge and the control system communicates the determined status of the reference thread gauge is not approved for inspecting the thread quality of the machined thread.

The thread gauge inspection apparatus may display that the determined status of the reference thread gauge is not approved for inspecting the thread quality of the machined thread when the control system communicates the determined status of the reference thread gauge is not approved for inspecting the thread quality of the machined thread.

The controller may track a usage amount the reference thread gauge is used during an inspection process. The thread gauge inspection apparatus communicates the tracked usage amount of the reference thread gauge to the control system. The control system processes the communicated the tracked usage amount to maintain a usage history of the reference thread gauge. The control system determines the status of the reference thread gauge based upon the maintained usage history of the reference thread gauge.

The count may be the tracked usage amount that the thread gauge inspection apparatus communicates to the control system.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A thread gauge inspection apparatus for inspecting a quality of a screw thread, the screw thread being a structure for converting between rotational movement and linear movement, comprising:
   a rotation device to bi-directionally rotate a reference screw thread gauge with respect to the screw thread, the reference thread gauge being a structure for converting between rotational movement and linear movement, said rotation device rotating the reference screw thread gauge in a first direction, the reference screw thread gauge engaging with the screw thread when said rotation device rotates the reference screw thread gauge in a first direction;
   a counting device to count, when the reference screw thread gauge is engaged with the screw thread, a number of turns the reference screw thread gauge is rotated by said rotation device; and
   an output device to communicate the counted number of turns the reference screw thread gauge is rotated by said rotation device, when the reference screw thread gauge is engaged with the screw thread, as a result of an inspection of a screw thread quality of the screw thread;
   said output device communicating whether the screw thread passed inspection based upon the counted number of turns the reference screw thread gauge is rotated by said rotation device, when the screw reference thread gauge is engaged with the screw thread.

2. The thread gauge inspection apparatus as claimed in claim 1, wherein said counting device counts a number of turns the reference screw thread gauge is rotated by said rotation device in said first direction, said first direction being a clockwise direction.

3. The thread gauge inspection apparatus as claimed in claim 1, wherein said counting device counts a number of turns the reference screw thread gauge is rotated by said rotation device in a second direction, said second direction being a counter-clockwise direction.

4. The thread gauge inspection apparatus as claimed in claim 1, further comprising:
   a torque monitoring device to monitor the torque produced by said rotation device as the reference screw thread gauge is rotated by said rotation device in said first direction;
   said torque monitoring device causing said rotation device to stop rotating the screw reference thread gauge in said first direction when the monitored torque exceeds a predetermined value.

5. The thread gauge inspection apparatus as claimed in claim 1, further comprising:
   a torque monitoring device to monitor the torque produced by said rotation device as the screw reference thread gauge is rotated by said rotation device in said first direction; and
   a clutch mechanism operatively connected between said rotation device and the reference screw thread gauge;
   said torque monitoring device causing said clutch mechanism to disengage the reference screw thread gauge from said rotation device when the monitored torque exceeds a predetermined value.

6. The thread gauge inspection apparatus as claimed in claim 1, further comprising:
   a ratcheting mechanism to cause the reference screw thread gauge to stop rotating in said first direction when a torque produced by said rotation device exceeds a predetermined value.

7. The thread gauge inspection apparatus, as claimed in claim 1, wherein said counting device is an optical encoder.

8. The thread gauge inspection apparatus, as claimed in claim 1, wherein said counting device is a mechanical encoder.

9. The thread gauge inspection apparatus, as claimed in claim 1, wherein said counting device is an electrical encoder.

10. The thread gauge inspection apparatus, as claimed in claim 1, wherein said counting device is a magnetic encoder.

11. The thread gauge inspection apparatus, as claimed in claim 1, wherein said output device displays, in real-time, the number of turns the reference screw thread gauge has been rotated by said rotation device in said first direction.

12. The thread gauge inspection apparatus, as claimed in claim 3, wherein said output device displays, in real-time, the number of turns the reference screw thread gauge has been rotated by said rotation device in said second direction.

13. The thread gauge inspection apparatus, as claimed in claim 4, wherein said torque monitoring device, when the monitored torque exceeds a predetermined value, causes said rotation device to stop rotating the reference screw thread gauge in the first direction and to rotate the reference screw thread gauge in a second direction.

14. The thread gauge inspection apparatus, as claimed in claim 1, further comprising:
   a receiving member to hold the reference screw thread gauge;
   said receiving member operatively coupled to said rotation device.

15. The thread gauge inspection apparatus, as claimed in claim 5, further comprising:
   a receiving member to hold the reference screw thread gauge;
   said receiving member operatively coupled to said clutch mechanism.

16. The thread gauge inspection apparatus, as claimed in claim 6, further comprising:
   a receiving member to hold the reference screw thread gauge;
   said receiving member operatively coupled to said ratcheting mechanism.

17. The thread gauge inspection apparatus, as claimed in claim 5, wherein said output device visually indicates that said rotation device has stopped rotating the reference screw thread gauge in said first direction.

18. The thread gauge inspection apparatus, as claimed in claim 6, wherein said output device visually indicates that said ratcheting mechanism has caused the reference screw thread gauge to stop rotating.

19. The thread gauge inspection apparatus, as claimed in claim 5, wherein said output device audibly indicates that said rotation device has stopped rotating the reference screw thread gauge in said first direction.

20. The thread gauge inspection apparatus, as claimed in claim 6, wherein said output device audibly indicates that said ratcheting mechanism has caused the reference screw thread gauge to stop rotating.

* * * * *